US012690048B2

(12) United States Patent
Zhang et al.

(10) Patent No.: US 12,690,048 B2
(45) Date of Patent: Jul. 21, 2026

(54) METHOD AND APPARATUS FOR MONITORING DOWNLINK CONTROL INFORMATION

(71) Applicant: Lenovo (Beijing) Limited, Beijing (CN)

(72) Inventors: Yu Zhang, Beijing (CN); Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 345 days.

(21) Appl. No.: 18/277,275

(22) PCT Filed: Mar. 11, 2021

(86) PCT No.: PCT/CN2021/080224
§ 371 (c)(1),
(2) Date: Aug. 15, 2023

(87) PCT Pub. No.: WO2022/188097
PCT Pub. Date: Sep. 15, 2022

(65) Prior Publication Data
US 2024/0121797 A1      Apr. 11, 2024

(51) Int. Cl.
*H04W 72/232* (2023.01)
*H04B 7/06* (2006.01)
(Continued)

(52) U.S. Cl.
CPC ...... *H04W 72/232* (2023.01); *H04B 7/06952* (2023.05); *H04L 5/0053* (2013.01); *H04W 74/0808* (2013.01)

(58) Field of Classification Search
CPC ............ H04W 72/232; H04W 74/0808; H04B 7/06952; H04L 5/0053
See application file for complete search history.

(56) References Cited

U.S. PATENT DOCUMENTS 12,363,736 B2 *  7/2025  He ........................ H04L 5/0053
2019/0141693 A1  5/2019  Guo et al.
(Continued)

FOREIGN PATENT DOCUMENTS

| CN | 112352464 A | 2/2021 |
| WO | 2020091080 A1 | 5/2020 |
| WO | 2021038121 A1 | 3/2021 |

OTHER PUBLICATIONS

Lenovo , "Channel access mechanisms for NR from 52.6 GHz to 71GHz", 3GPP TSG RAN WG1 #104-e, R1-2100062, e-meeting [retrieved Aug. 10, 2023]. Retrieved from the Internet <https://www.3gpp.org/ftp/tsg_ran/WG1_RL1/TSGR1_104-e/Docs>., Feb. 2021, 16 Pages.

(Continued)

*Primary Examiner* — John D Blanton
(74) *Attorney, Agent, or Firm* — FIG. 1 Patents

(57) ABSTRACT

The present application relates to a method and an apparatus for monitoring DCI. The method includes: receiving a DCI from a BS, wherein the DCI includes an indicator; determining one or more sensing beams used by the BS to perform a LBT procedure according to the indicator and a higher layer signaling; and determining one or more transmission beams used by the BS to transmit PDCCH according to the indicator and the higher layer signaling, wherein the one or more transmission beams are within a spatial region of a CO initiated by the BS after completing the directional LBT with the one or more sensing beams.

20 Claims, 28 Drawing Sheets

(51) Int. Cl.
H04L 5/00 (2006.01)
H04W 74/0808 (2024.01)

(56) References Cited

U.S. PATENT DOCUMENTS

| | | | | |
|---|---|---|---|---|
| 2019/0268053 | A1* | 8/2019 | John Wilson | H04B 7/0634 |
| 2019/0335477 | A1* | 10/2019 | Nam | H04W 72/542 |
| 2020/0022000 | A1* | 1/2020 | Venugopal | H04B 7/0408 |
| 2020/0053775 | A1* | 2/2020 | Lee | H04W 74/0808 |
| 2020/0100222 | A1* | 3/2020 | Chakraborty | H04W 72/121 |
| 2020/0186232 | A1* | 6/2020 | Levitsky | H04W 24/10 |
| 2020/0280971 | A1* | 9/2020 | Moon | H04W 74/0808 |
| 2021/0243741 | A1* | 8/2021 | Lin | H04W 76/28 |
| 2021/0250144 | A1* | 8/2021 | Nam | H04L 5/0057 |
| 2021/0392683 | A1* | 12/2021 | Awadin | H04W 74/006 |
| 2022/0046702 | A1* | 2/2022 | Hu | H04W 74/0808 |
| 2022/0061031 | A1* | 2/2022 | Park | H04W 74/0808 |
| 2022/0086894 | A1* | 3/2022 | Papasakellariou | H04L 5/0053 |
| 2022/0124807 | A1* | 4/2022 | Hu | H04L 5/0051 |
| 2022/0232546 | A1* | 7/2022 | Hakola | H04B 7/088 |
| 2022/0272706 | A1* | 8/2022 | Sengupta | H04W 52/18 |
| 2022/0338262 | A1* | 10/2022 | He | H04W 72/54 |
| 2022/0377810 | A1* | 11/2022 | Bhamri | H04B 7/0695 |
| 2023/0024010 | A1* | 1/2023 | Ma | H04L 5/0053 |
| 2023/0040433 | A1* | 2/2023 | Zhang | H04L 5/0053 |
| 2023/0042391 | A1* | 2/2023 | Kim | H04L 5/0051 |
| 2023/0054184 | A1* | 2/2023 | Loehr | H04W 74/0808 |
| 2023/0072340 | A1* | 3/2023 | El Hamss | H04W 74/0808 |
| 2023/0103557 | A1* | 4/2023 | Li | H04L 5/0053 |
| | | | | 370/329 |
| 2023/0108044 | A1* | 4/2023 | Zhang | H04L 5/0091 |
| | | | | 370/329 |
| 2023/0155659 | A1* | 5/2023 | Ganesan | H04B 7/06968 |
| | | | | 370/329 |
| 2023/0164835 | A1* | 5/2023 | Ganesan | H04W 74/0808 |
| | | | | 370/329 |
| 2023/0171705 | A1* | 6/2023 | Go | H04W 52/42 |
| | | | | 370/318 |
| 2023/0284197 | A1* | 9/2023 | Zhang | H04B 7/06964 |
| | | | | 370/225 |
| 2023/0300644 | A1* | 9/2023 | Zhang | H04B 7/024 |
| | | | | 370/329 |
| 2023/0300881 | A1* | 9/2023 | Myung | H04W 74/0808 |
| | | | | 370/329 |
| 2023/0344576 | A1* | 10/2023 | Lim | H04B 7/06968 |
| 2023/0345259 | A1* | 10/2023 | Chung | H04B 7/06968 |
| 2023/0361894 | A1* | 11/2023 | Bhamri | H04B 17/345 |
| 2023/0396307 | A1* | 12/2023 | Bhamri | H04B 7/06952 |
| 2023/0397191 | A1* | 12/2023 | Bagheri | H04W 72/1263 |
| 2023/0403055 | A1* | 12/2023 | Bhamri | H04W 74/0808 |
| 2023/0412231 | A1* | 12/2023 | Cao | H04B 7/088 |
| 2024/0031001 | A1* | 1/2024 | Cheema | H04B 7/10 |
| 2024/0032093 | A1* | 1/2024 | Pan | H04W 74/0808 |
| 2024/0063859 | A1* | 2/2024 | Grieco | H04B 7/0486 |
| 2024/0073949 | A1* | 2/2024 | Bhamri | H04B 7/06952 |
| 2024/0121797 | A1* | 4/2024 | Zhang | H04L 5/0053 |
| 2024/0155646 | A1* | 5/2024 | Xu | H04L 5/0053 |
| 2025/0240124 | A1* | 7/2025 | Baskaran | H04L 1/1864 |

OTHER PUBLICATIONS

PCT/CN2021/080224 , "International Preliminary Report on Patentability", PCT Application No. PCT/CN2021/080224, Sep. 21, 2023, 5 pages.

PCT/CN2021/080224 , "International Search Report and Written Opinion", PCT Application No. PCT/CN2021/080224, Dec. 8, 2021, 6 pages.

Vivo , "Discussions on channel access mechanism for NR operation from 52.6 GHz to 71 GHz", 3GPP TSG RAN WG1 #104-e, R1-2100434, e-Meeting [retrieved Aug. 10, 2023]. Retrieved from the Internet <https://www.3gpp.org/ftp/tsg_ran/WG1_RL1/TSGR1_104-e/Docs>., Feb. 2021, 5 Pages.

* cited by examiner

202

202A

201

202 c1

B1, b1

A1, a1

201

302

302B

301

402

402B

401

502

502B

501

702

702B

701

Figure 8:
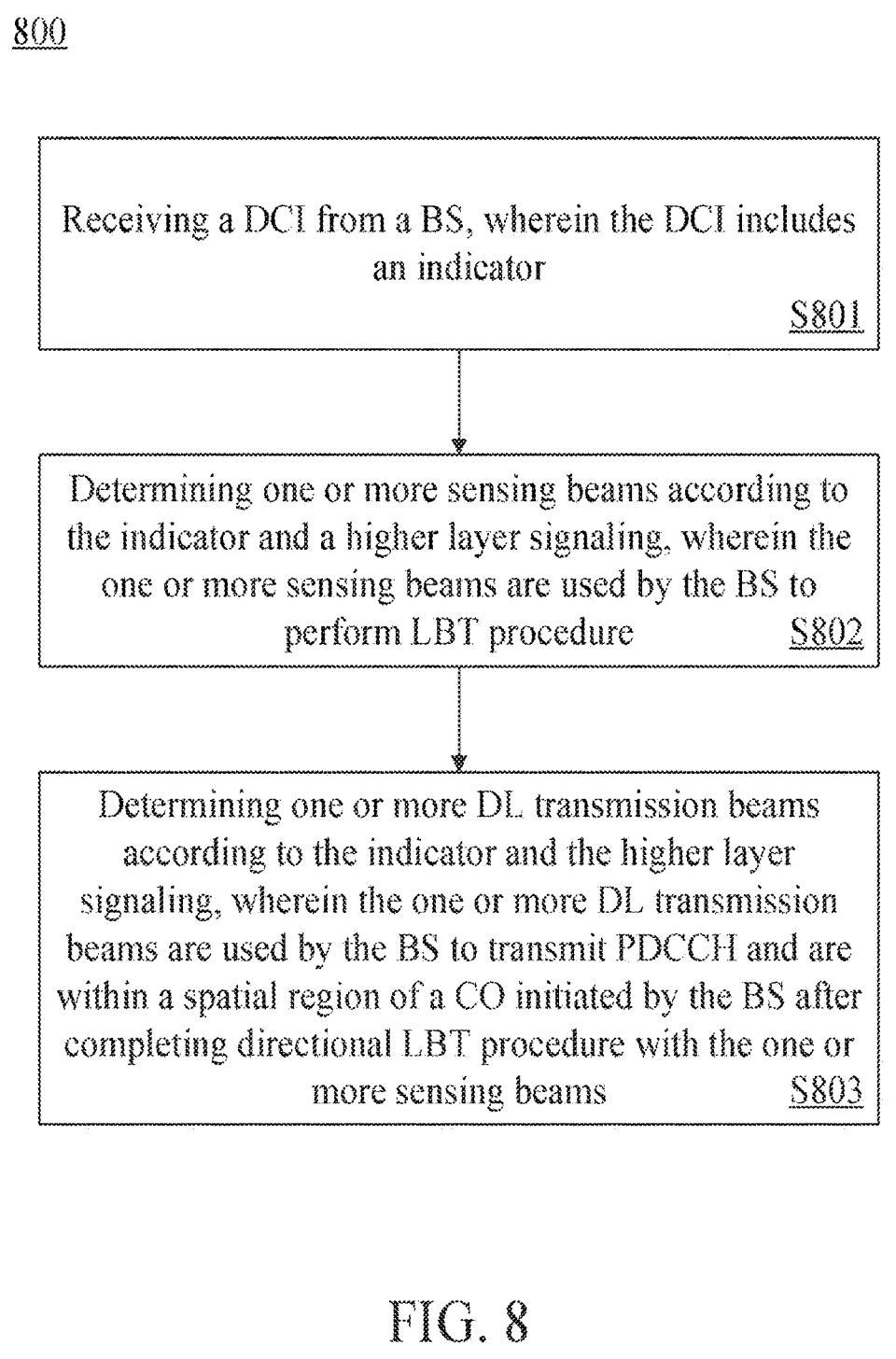

800

Receiving a DCI from a BS, wherein the DCI includes an indicator

S801

Determining one or more sensing beams according to the indicator and a higher layer signaling, wherein the one or more sensing beams are used by the BS to perform LBT procedure

S802

Determining one or more DL transmission beams according to the indicator and the higher layer signaling, wherein the one or more DL transmission beams are used by the BS to transmit PDCCH and are within a spatial region of a CO initiated by the BS after completing directional LBT procedure with the one or more sensing beams

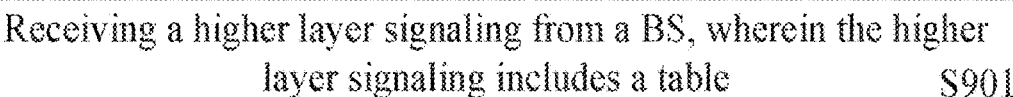

Receiving a higher layer signaling from a BS, wherein the higher layer signaling includes a table     S901

Receiving a DCI from a BS, wherein the DCI includes an indicator     S902

Determining one or more sensing beams according to the indicator and the higher layer signaling, wherein the indicator matches at least one row index of the table and the one or more sensing beams are used by the BS to perform LBT procedure     S903

Determining a plurality of DL transmission beams according the at least one row index of the table, wherein the plurality of DL transmission beams are within a spatial region of a CO initiated by the BS after completing the directional LBT procedure with the one or more sensing beams     S904

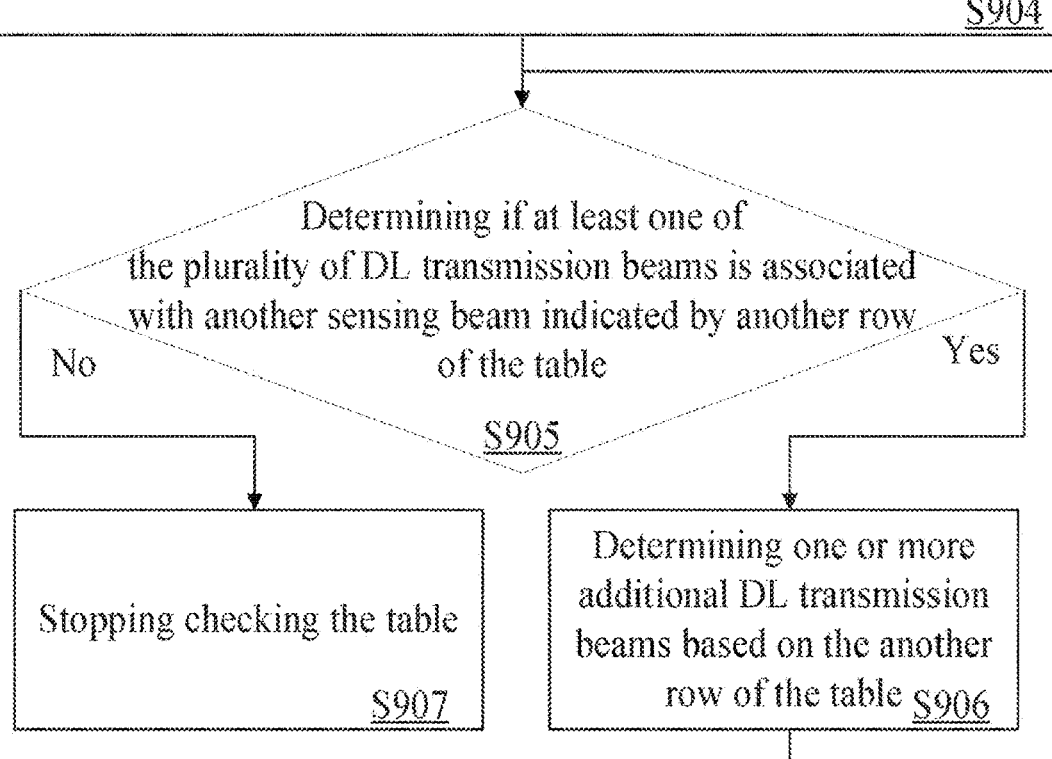

Determining if at least one of the plurality of DL transmission beams is associated with another sensing beam indicated by another row of the table     S905

No

Yes

Stopping checking the table     S907

Determining one or more additional DL transmission beams based on the another row of the table S906

Figure 10:
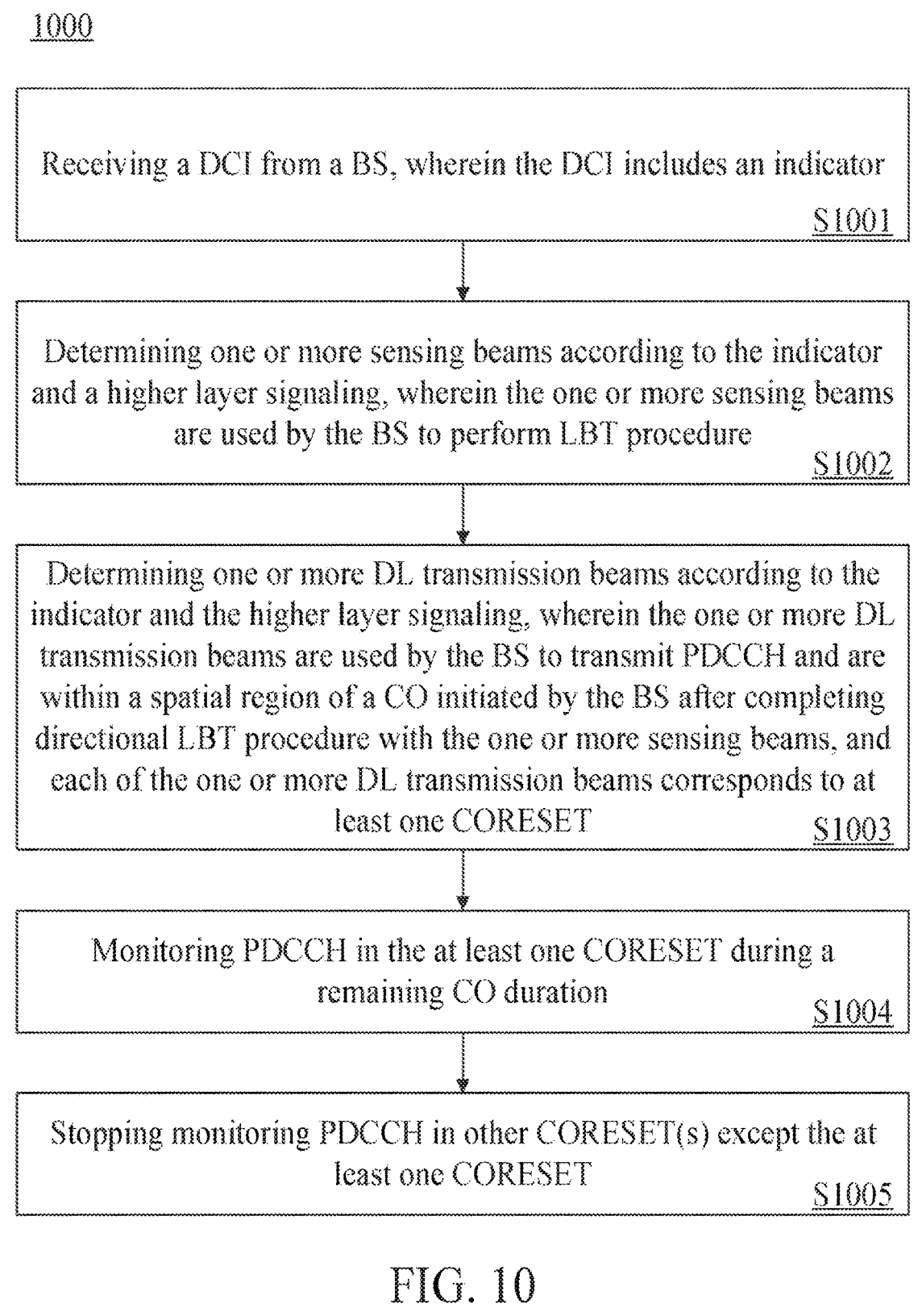

Receiving a DCI from a BS, wherein the DCI includes an indicator

S1001

Determining one or more sensing beams according to the indicator and a higher layer signaling, wherein the one or more sensing beams are used by the BS to perform LBT procedure

S1002

Determining one or more DL transmission beams according to the indicator and the higher layer signaling, wherein the one or more DL transmission beams are used by the BS to transmit PDCCH and are within a spatial region of a CO initiated by the BS after completing directional LBT procedure with the one or more sensing beams, and each of the one or more DL transmission beams corresponds to at least one CORESET

S1003

Monitoring PDCCH in the at least one CORESET during a remaining CO duration

S1004

Stopping monitoring PDCCH in other CORESET(s) except the at least one CORESET

Figure 11A:
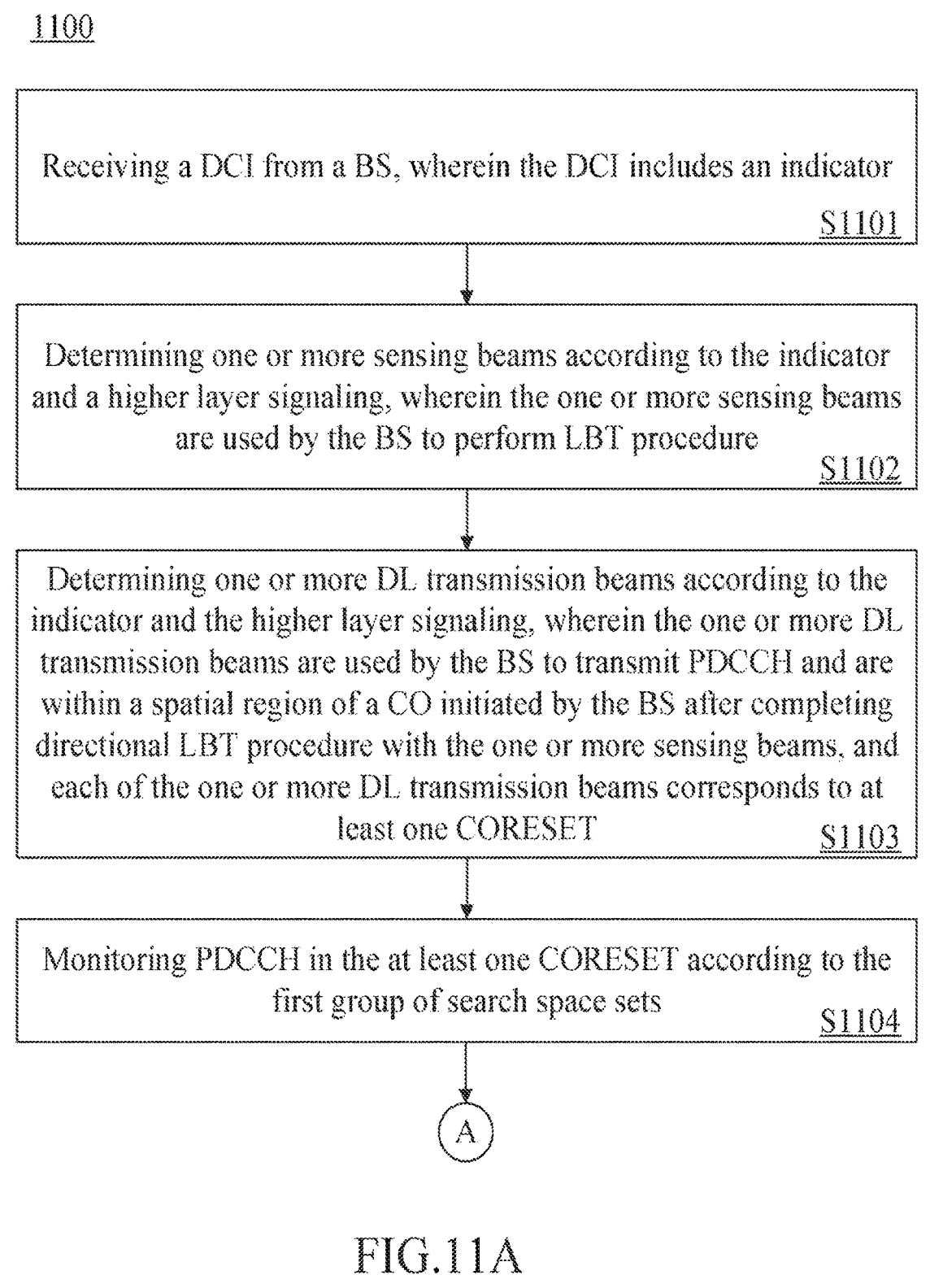

Receiving a DCI from a BS, wherein the DCI includes an indicator
S1101

Determining one or more sensing beams according to the indicator and a higher layer signaling, wherein the one or more sensing beams are used by the BS to perform LBT procedure
S1102

Determining one or more DL transmission beams according to the indicator and the higher layer signaling, wherein the one or more DL transmission beams are used by the BS to transmit PDCCH and are within a spatial region of a CO initiated by the BS after completing directional LBT procedure with the one or more sensing beams, and each of the one or more DL transmission beams corresponds to at least one CORESET
S1103

Monitoring PDCCH in the at least one CORESET according to the first group of search space sets
S1104

METHOD AND APPARATUS FOR MONITORING DOWNLINK CONTROL INFORMATION

TECHNICAL FIELD

Embodiments of the present application generally relate to wireless communication technology, especially to a method and an apparatus for downlink control information monitoring and reception under 3GPP (3rd Generation Partnership Project) 5G New Radio (NR).

BACKGROUND

For network of 3rd Generation Partnership Project (3GPP) 5G New Radio (NR), technologies of data transmission on unlicensed spectrum are developed. When unlicensed spectrum is used for data transmission, channel access procedure (e.g., Listen-Before-Talk procedure, LBT procedure) may be required to be performed by the transmitting device, for example base station (BS) or user equipment (UE). The LBT procedure is executed by performing energy detection on a certain channel. Only when the LBT procedure generates a success result can the transmitting device initiates transmission(s) on the certain channel, which is known as initiating a channel occupancy (CO). These transmission(s) can occupy the channel for a duration of time, which is known as a CO duration or a COT (channel occupancy time) and is up to a maximum channel occupancy time (MCOT). Unless the LBT procedure is successful, the transmitting device cannot initiate any transmission(s) and will continue performing the LBT procedure until the LBT procedure generates a success result. To improve the probability of successful channel access and to enhance the spatial reuse, a directional LBT procedure, which is executed by performing energy detection via one or more sensing beams, is introduced. According to the one or more sensing beams, the transmitter and its receivers can determine a spatial region, which is known as the spatial region of the CO initiated by the transmitting device performing directional LBT procedure with the one or more sensing beams. A transmission beam used to transmit on the channel during the CO duration should be within the spatial region of the CO.

When operating a network of 3GPP 5G NR in the Unlicensed Spectrum, a base station (BS) may initiate a CO after completing a directional LBT procedure with one or more sensing beams that may result in a situation where some of downlink transmission beams used by the BS may not always be within a spatial region of the CO. Accordingly, the relations between the downlink transmission beams and the sensing beams used by the BS to perform directional LBT procedure is needed for a user equipment (UE) monitoring physical downlink control channel (PDCCH) during the CO duration. A PDCCH corresponds to a set of resource elements carrying a downlink control information (DCI). The DCI consists of one or more indicators.

SUMMARY

Some embodiments of the present application provide a method for a user equipment (UE) that includes receiving a downlink control information (DCI) from a base station (BS), wherein the DCI includes an indicator; determining one of more sensing beams according to the indicator and a higher layer signaling, wherein one of more sensing beams are used by the BS to perform a Listen-Before-Talk (LBT)

procedure; and determining one or more transmission beams used by the BS to transmit physical downlink control channel (PDCCH) according to the indicator and the higher layer signaling, wherein the one or more transmission beams are within a spatial region of a channel occupancy (CO) initiated by the BS after completing the LBT procedure with the one or more sensing beams.

Some embodiments of the present application provide an apparatus that includes a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the abovementioned method for wireless communications.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIG. 8 illustrates a flow chart of a method for wireless communications according to an embodiment of the present disclosure.

FIG. 9 illustrates a flow chart of a method for wireless communications according to an embodiment of the present disclosure.

FIG. 10 illustrates a flow chart of a method for wireless communications according to an embodiment of the present disclosure.

FIGS. 11A and 11B illustrate flow charts of a method for wireless communications according to an embodiment of the present disclosure.

DETAILED DESCRIPTION

The detailed description set forth below in connection with the included tables and appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Reference will now be made in detail to some embodiments of the present application, examples of which are illustrated in the accompanying drawings. Embodiments of the present application may be provided in a network architecture that adopts various service scenarios, for example but is not limited to, 3rd Generation Partnership Project (3GPP) 3G, long-term evolution (LTE), LTE-Advanced (LTE-A), 3GPP 4G, 3GPP 5G New Radio (NR), etc. It is contemplated that along with the 3GPP and related communication technology development, the terminologies recited in the present application may change, which should not affect the principle of the present application.

Figure 1:
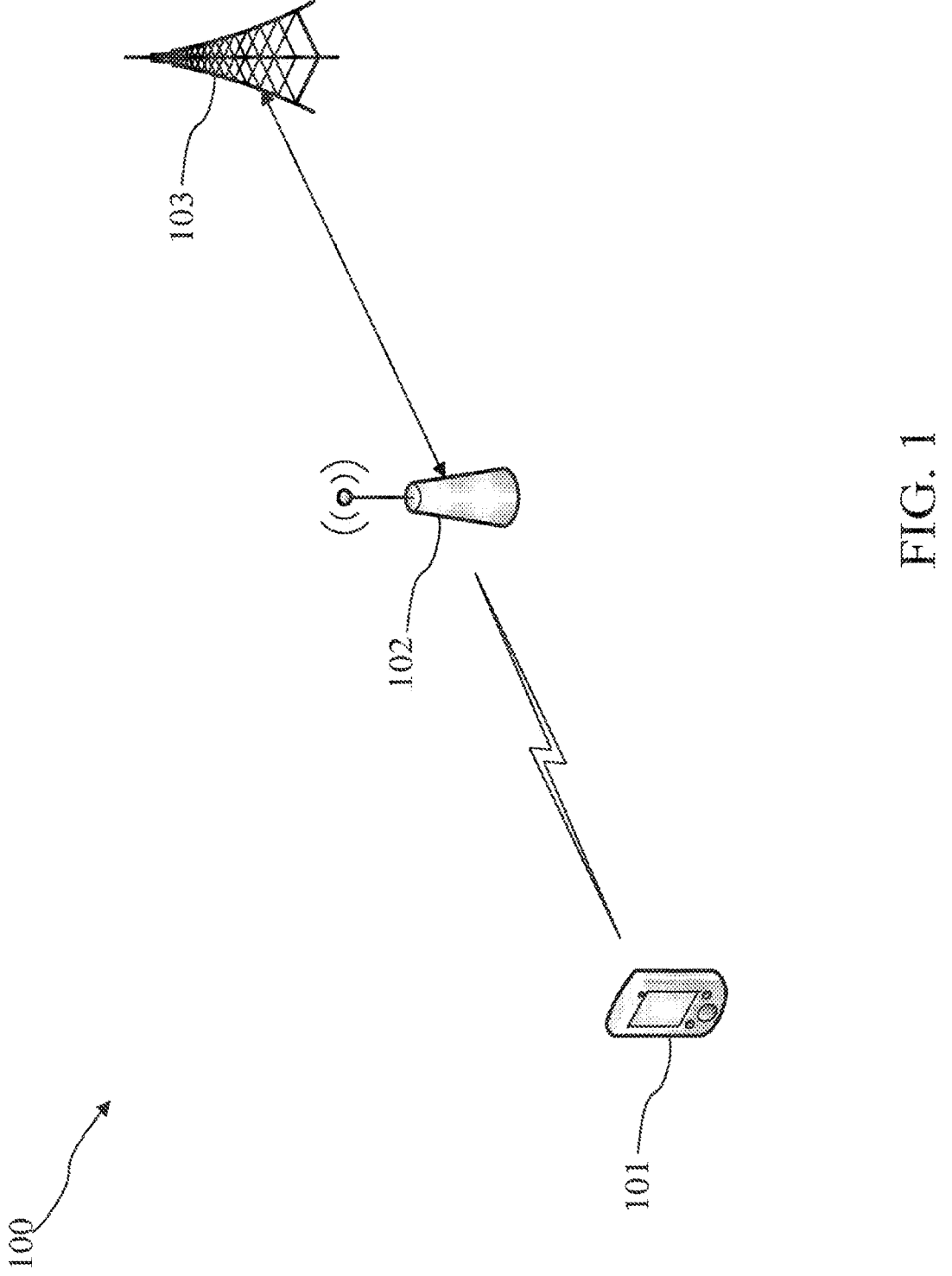
FIG. 1 illustrates a schematic diagram of a wireless communication system in accordance with some embodiments of the present application.

Referring to FIG. 1, a wireless communication system 100 may include a user equipment (UE) 101, a base station (BS) 102 and a core network (CN) 103. Although a specific number of the UE 101, the BS 102 and the CN 103 are depicted in FIG. 1, it is contemplated that any number of the UEs 101, the BSs 102 and the CNs 103 may be included in the wireless communication system 100.

The CN 103 may include a core Access and Mobility management Function (AMF) entity. The BS 102, which may communicate with the CN 103, may operate or work under the control of the AMF entity. The CN 103 may further include a User Plane Function (UPF) entity, which communicatively coupled with the AMF entity.

The BS 102 may be distributed over a geographic region. In certain embodiments of the present application, the BS 102 may also be referred to as an access point, an access terminal, a base, a base unit, a macro cell, a Node-B, an evolved Node-B (eNB), a next generation Node-B (gNB), a Home Node-B, a relay node, or a device, or described using other terminology used in the art. The BS 102 is generally part of a radio access network that may include one or more controllers communicably coupled to one or more corresponding BS(s).

The UE 101 may include, for example, but is not limited to, computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), Internet of Thing (IoT) devices, or the like.

According to some embodiments of the present application, the UE 101 may include, for example, but is not limited to, a portable wireless communication device, a smart phone, a cellular telephone, a flip phone, a device having a subscriber identity module, a personal computer, a selective call receiver, a wireless sensor, a monitoring device, or any other device that is capable of sending and receiving communication signals on a wireless network.

In some embodiments of the present application, the UE 101 may include, for example, but is not limited to, wearable devices, such as smart watches, fitness bands, optical head-mounted displays, or the like. Moreover, the UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE 101 may communicate directly with the BS 102 via uplink communication signals.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3GPP-based network, a 3GPP 5G network, a satellite communications network, a high altitude platform network, and/or other communications networks.

In some embodiments of the present application, the wireless communication system 100 is compatible with the 5G NR of the 3GPP protocol or the 5G NR-light of the 3GPP protocol, wherein the BS 102 transmits data using an OFDM modulation scheme on the downlink (DL) and the UE 101 transmits data on the uplink (UL) using a single-carrier frequency division multiple access (SC-FDMA) or OFDM scheme. More generally, however, the wireless communication system 100 may implement some other open or proprietary communication protocols, for example, WiMAX, among other protocols.

In some embodiments of the present application, the UE 101 and BS 102 may communicate using other communication protocols, such as the IEEE 802.11 family of wireless communication protocols. Further, in some embodiments of the present application, the UE 101 and BS 102 may communicate over licensed spectrums, whereas in other embodiments, the UE 101 and BS 102 may communicate over unlicensed spectrums. The present application is not intended to be limited to the implementation of any particular wireless communication system architecture or protocol. In yet some embodiments of present application, the BS 102 may communicate with the UE 101 using the 3GPP 5G protocols.

According to some existed agreements, the UE 101 and the BS 102 included in the wireless communication system 100 may be compatible with 5G NR operating on unlicensed spectrum (NR-U) of the 3GPP protocol. To improve the probability of successful channel access and to enhance the spatial reuse, directional Listen-Before-Talk (LBT) procedure, which is executed by performing energy detection via one or more sensing beams, may be introduced.

When operating a network of 3GPP 5G New Radio in the Unlicensed Spectrum, the BS 102 may initiate a channel occupancy (CO) after completing a directional LBT procedure with one or more sensing beams that may result in a situation where some of downlink (DL) transmission beams may not always be within a spatial region of the CO associated with the one or more sensing beams. Accordingly, the relations between the DL transmission beams and the one or more sensing beams used by the BS 102 to perform directional LBT procedure needs to be indicated to the UE for monitoring physical downlink control channel (PDCCH) during a CO duration in different network scenarios which will be discussed as follows.

In some embodiments, the UE 101 may receive a downlink control information (DCI) from the BS 102. The DCI may include an indicator indicating relations between one or more sensing beams and one or more DL transmission beams. According to the indicator and a higher layer signaling, the UE 101 may: (1) determine one or more sensing beams used by the BS 102 to perform a directional LBT procedure; and (2) determine one or more DL transmission beams used by the BS 102 to transmit PDCCH. The one or more DL transmission beams used by the BS 102 to transmit PDCCH should be within a spatial region of a CO initiated by the BS 102 after completing the directional LBT procedure with the one or more sensing beams, that is, a CO associated with the one or more sensing beams.

In one embodiment, a table for recording relations between DL transmission beams and sensing beams may be introduced. In particular, the BS 102 may determine a table which records relations between the DL transmission beams and the sensing beams. Such table may include multiple rows, and each row may indicate: (1) a sensing beam used by the BS 102 to perform directional LBT procedure; and (2) one or more DL transmission beams which are within a spatial region of a CO initiated by the BS 102 after completing a directional LBT procedure with the sensing beam. Each row of the table is associated with a row index.

For example, each row of the table may include: (1) a transmission configuration indicator (TCI) state which indicates quasi co-location (QCL) information corresponding to the sensing beam; and (2) one or more TCI states which indicate QCL information corresponding to the one or more DL transmission beams which are within the spatial region of the CO initiated by the BS 102 after completing a directional LBT procedure with the sensing beam. It should be noted that according to the QCL information corresponding to a beam, the UE can identify the beam.

Further, when another sensing beam indicated in another row of the table corresponds to one DL transmission beam of the one or more DL transmission beams (e.g., the QCL information corresponding to the another sensing beam is the same as QCL information corresponding to one DL transmission beam of the one or more DL transmission beams) and one or more additional DL transmission beams are indicated in this row, the one or more additional DL transmission beams indicated in this row may also be determined within the spatial region of the CO initiated by the BS 102 after completing a directional LBT procedure with the one or more sensing beam.

Then, the BS 102 may transmit a higher layer signaling (e.g., radio resource control signaling, and/or media access control-control element) carrying the table to the UE 101. Accordingly, the UE 101 may be informed of the relations between the DL transmission beams and the sensing beams used by the BS 102 according to the table. It should be noted that, the BS 102 may transmit different tables to different UEs, and the same sensing beam is indicated by the same row among the different tables.

Subsequently, after the BS 102 completes a directional LBT procedure with one or more sensing beams, the BS 102 may inform the UE 101 of the one or more sensing beams by transmitting an indicator in a DCI carried by a group common physical downlink control channel (GC-PDCCH). A GC-PDCCH is a special PDCCH carrying a DCI for multiple UEs. In other words, the UE 101 may be informed of the one or more sensing beams according to the indicator in the DCI carried by the GC-PDCCH.

In detail, after the BS 102 completes a directional LBT procedure with one or more sensing beams, the BS 102 will initiate a CO. Then, the BS 102 will transmit GC-PDCCH with the indicator that indicates the one or more row indexes that are associated with the one or more sensing beams, to the UE 101. Each of the one or more sensing beams have been recorded in a row of the table with an associated row index.

Accordingly, the UE 101 may receive the GC-PDCCH with the indicator that is set to a value of one or more row indexes and determine, based on the value, that the BS 102 has initiated the CO after completing the directional LBT procedure with the one or more sensing beams according to the corresponding rows of the table. Furthermore, the UE 101 may determine one or more DL transmission beams according to the relations between the DL transmission beams and the one or more sensing beams as recorded in the table.

Figure 2A:
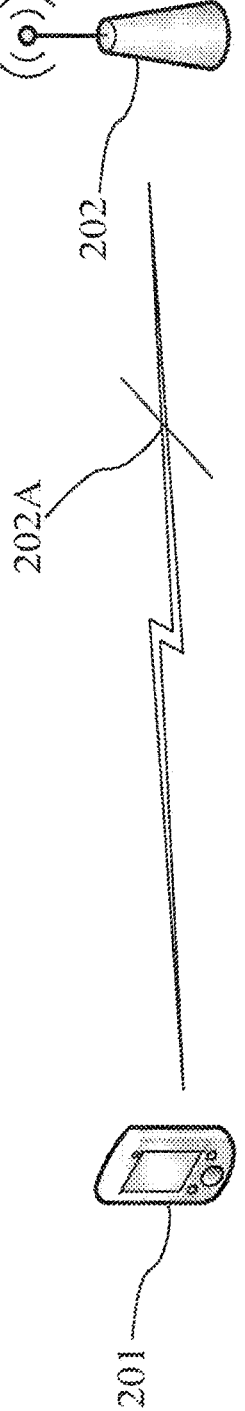
FIG. 2A illustrates a schematic diagram of message transmission in accordance with some embodiments of the present application.
Figure 2B:
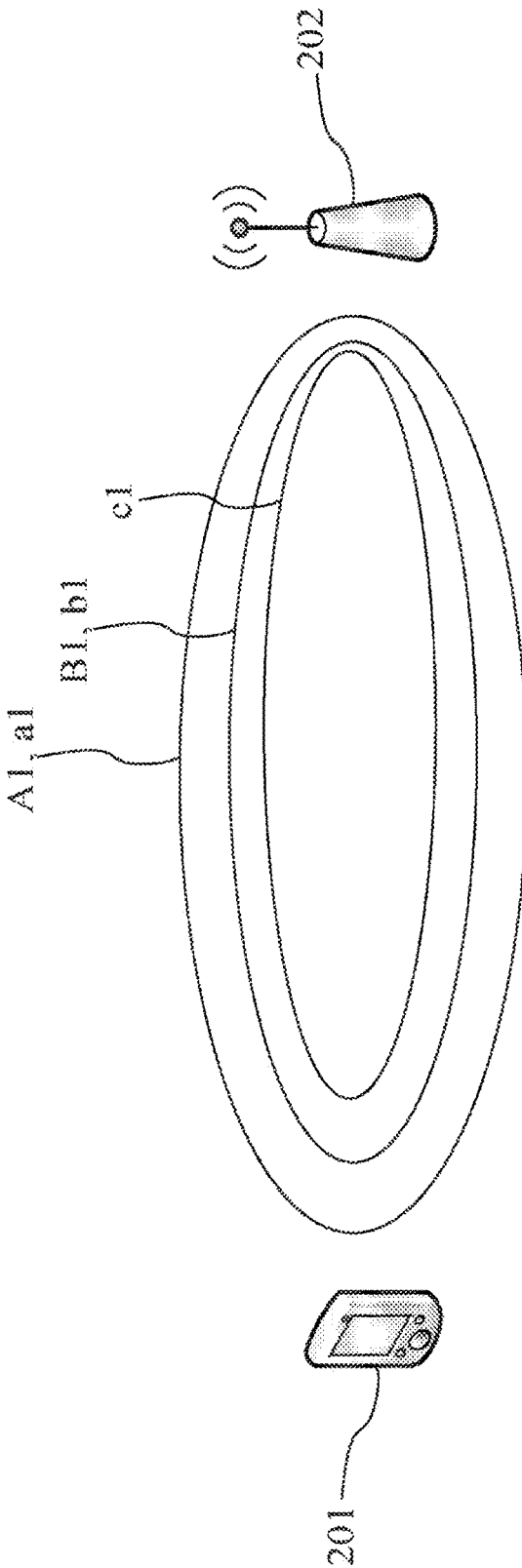
FIG. 2B illustrates a schematic diagram of beamforming in accordance with some embodiments of the present application.

Referring to FIGS. 2A and 2B, in one implementation, a sensing beam A1 and a DL transmission beam a1 may be indicated by the same TCI state '00', a sensing beam B1 and a DL transmission beam b1 are indicated by the same TCI state '01' and a DL transmission beam c1 is indicated by TCI state '10'. Using this TCI state information, a BS 202 may create a table, for example a table T-1 shown below, and transmit this table using higher layer signaling 202A to the UE 201.

TABLE T-1

| Row index | Sensing Beam | DL Transmission Beam |
|---|---|---|
| 0 | 00 | 01 |
| 1 | 01 | 10 |

Figure 2C:
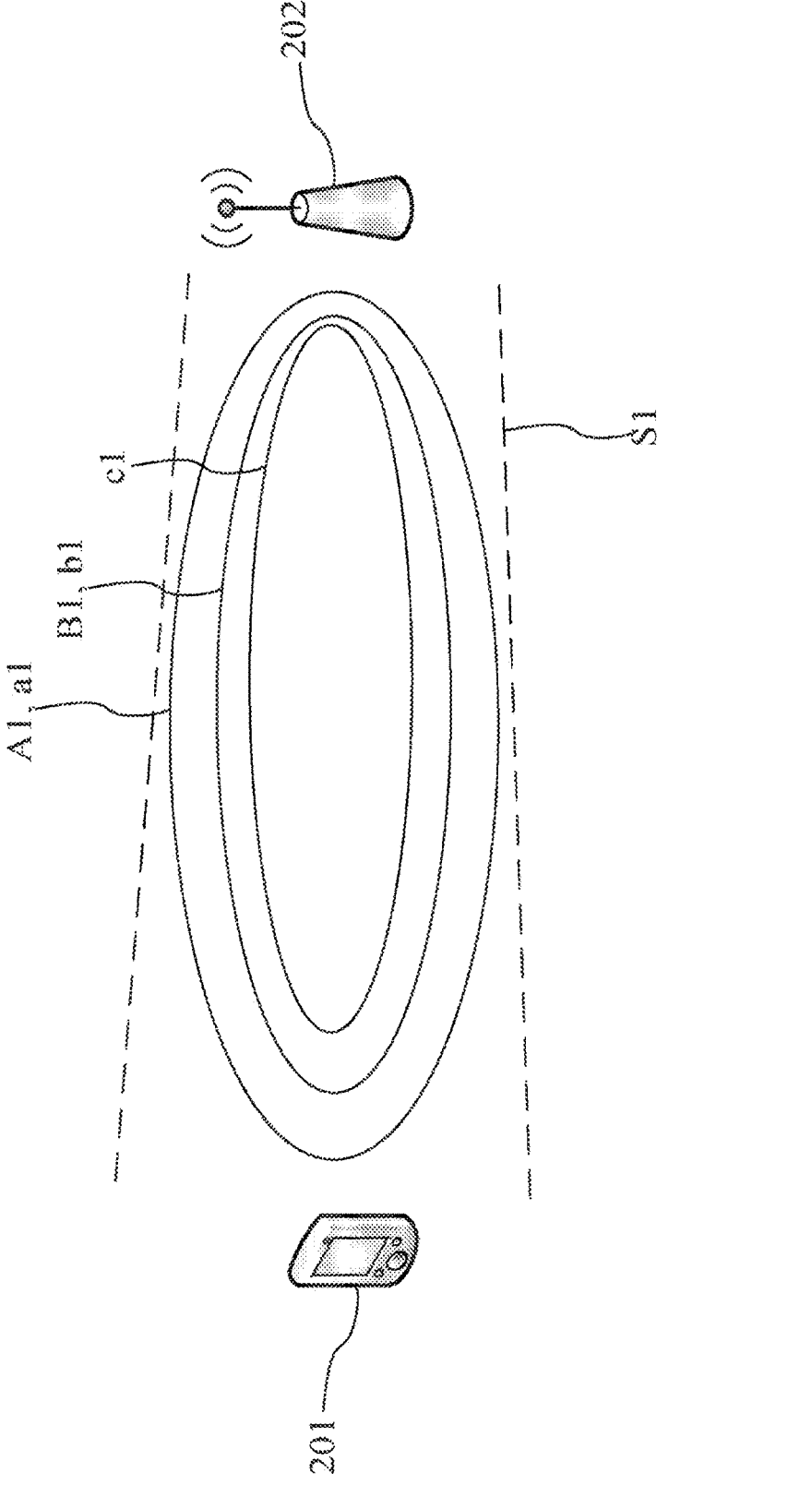
FIG. 2C illustrates a schematic diagram of beamforming in accordance with some embodiments of the present application.

Referring to FIG. 2C, when the BS 202 initiates a CO after completing a directional LBT procedure with the sensing beam A1, the BS 202 will transmit a GC-PDCCH carrying an indicator that is set to a value of the row index '0'. The row index value of '0' corresponds to the sensing beam A1 according to the TCI state of '00' as shown in table T-1. After a UE 201 receives the GC-PDCCH, the UE 201 determines that the value of the received indicator, e.g., the value of '0', matches the first row index, that is, the row index '0', in the table T-1. The row associated with a row index '0' corresponds to the sensing beam A1 based on the TCI state of '00'. With this information, the UE 201 determines the CO initiated by the BS 202 after completing the directional LBT procedure with the sensing beam A1.

Accordingly, based on the table T-1, the UE 201 can determine that DL transmission beams used by the BS 202 within a spatial region S1 of the CO initiated by the BS 202 after completing a directional LBT procedure with the sensing beam A1 include at least: (1) the DL transmission beam a1, which is indicated by the same TCI state '00' as the sensing beam A1; and (2) the DL transmission beam b1, which is identified with the TCI state '01' in the same row with row index '0'.

Further, the UE 201 can determine if the DL transmission beam b1 matches any sensing beam in another row of the table T-1. In this implementation, the UE 201 may determine that the DL transmission beam b1, identified by TCI state of '01', matches the sensing beam in a row with row index '1' of the table T-1 based on the same TCI state identified. Accordingly, the UE 201 may determine that DL transmission beams within the spatial region S1 of the CO initiated by the BS 201 after completing a directional LBT procedure with the sensing beam A1 further include the DL transmission beam c1, which is indicated by TCI state '10' in the same row with row index '1'.

Next, the UE 201 can determine if the DL transmission beam c1 matches any sensing beam in any other row of the table T-1. In this implementation, the UE 201 determines that no sensing beam identified in any other row of the table T-1, based on the included TCI state, matches DL transmission beam c1. Accordingly, the UE 101 stops checking the table T-1.

In the implementation, after checking the entire table T-1, the UE 201 may determine that DL transmission beams a1, b1 and c1 are within the spatial region S1 of the CO initiated by the BS 201 after completing the directional LBT procedure with the sensing beam A1.

Figure 2D:
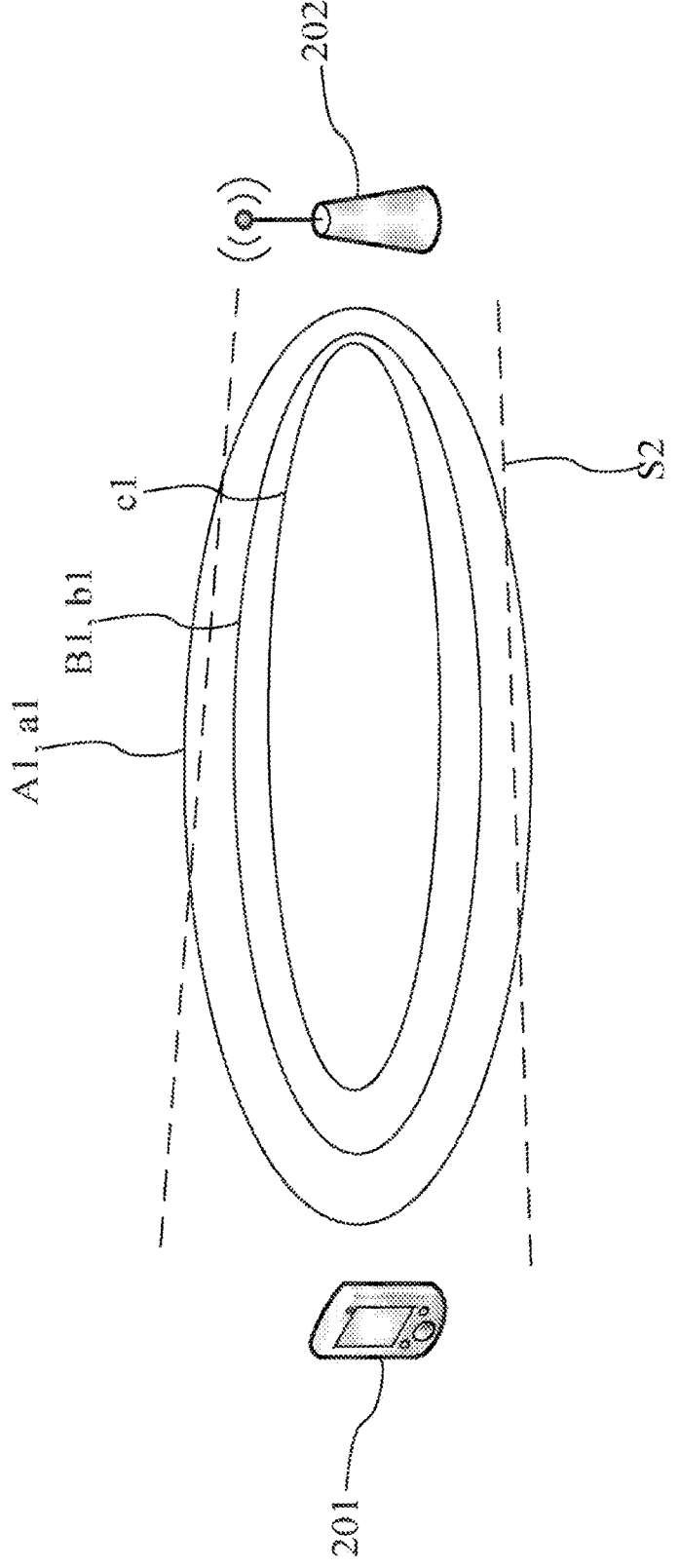
FIG. 2D illustrates a schematic diagram of beamforming in accordance with some embodiments of the present application.

Referring to FIG. 2D, when the BS 202 initiates a CO after completing a directional LBT procedure with the sensing beam B1, the BS 202 will transmit a GC-PDCCH carrying an indicator that is set to a value of the row index '1'. The row index value of '1' corresponds to the sensing beam B1 according to TCI state of '01' as shown in table T-1. After the UE 201 receives the GC-PDCCH, the UE 201 determines that the value of the received indicator, e.g., the value of '1', matches the second row index, that is, the row index '1', in the table T-1. The row associated with the row index '1' corresponds to the sensing beam B1 based on the TCI state of '01'. With this information, the UE 201 determines that the CO is initiated by the BS 202 after completing the directional LBT procedure with the sensing beam B1

Accordingly, based on the table T-1, the UE 201 may determine that DL transmission beams used by the BS 201 within a spatial region S2 of the CO initiated by the BS 202 after completing the directional LBT procedure with the sensing beam B1 include at least: (1) the DL transmission beam b1, which is indicated by the same TCI state '01' as the sensing beam B1; and (2) the DL transmission beam c1, which is identified with the TCI state '10' in the same row with row index '1'.

Further, the UE 201 may determine if the DL transmission beam c1 matches any sensing beam in any other row of the table T-1. In this implementation, the UE 201 may determine that no sensing beam identified in any other row of the table T-1 matches DL transmission beam c1. Accordingly, the UE 201 stops checking the table T-1. After checking the entire table T-1, the UE 201 may then determine that DL transmission beams b1 and c1 are within the spatial region S2 of the CO initiated by the BS 202 after completing the directional LBT procedure with the sensing beam B1.

Figure 3A:
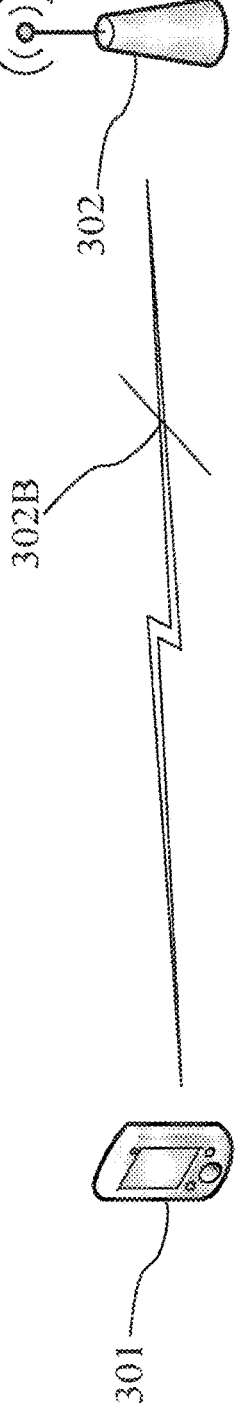
FIG. 3A illustrates a schematic diagram of message transmission in accordance with some embodiments of the present application.
Figure 3B:
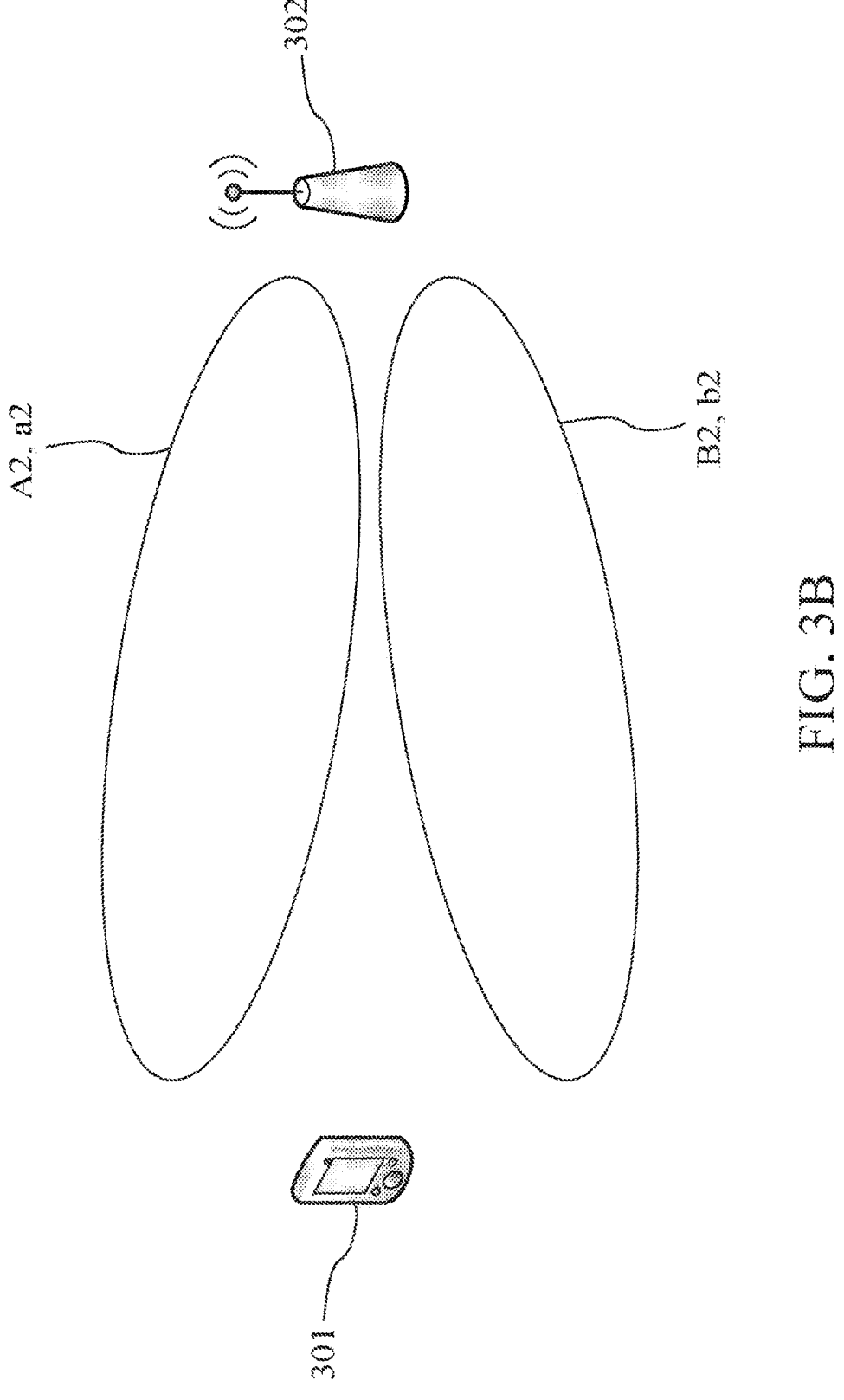
FIG. 3B illustrates a schematic diagram of beamforming in accordance with some embodiments of the present application.

Referring to FIGS. 3A and 3B, in one implementation, a sensing beam A2 and a DL transmission beam a2 may be indicated by the same TCI state '0' and a sensing beam B2 and a DL transmission beam b2 may be indicated by the same TCI state '1'. Accordingly, a BS 302 may determine a table T-2 as shown below and transmit this table using a higher layer signaling 302B to a UE 301.

TABLE T-2

| Row index | Sensing Beam | DL Transmission Beam |
|---|---|---|
| 0 | 0 | NULL |
| 1 | 1 | NULL |

Figure 3C:
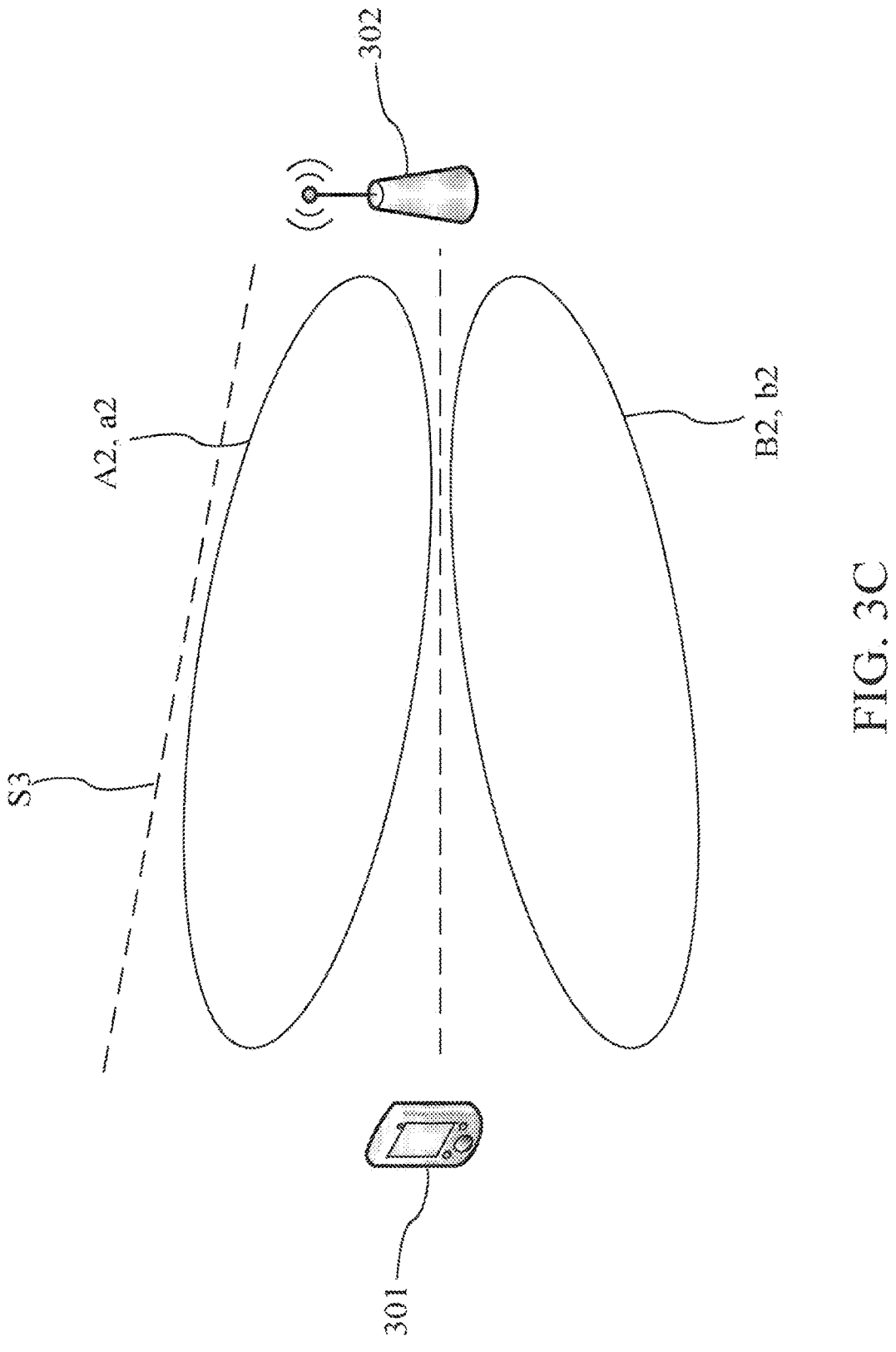
FIG. 3C illustrates a schematic diagram of beamforming in accordance with some embodiments of the present application.

Referring to FIG. 3C, when the BS 302 initiates a CO after completing a directional LBT procedure with the sensing beam A2, the BS 302 will transmit a GC-PDCCH carrying an indicator that is set to a value of the row index '0'. The row index value of '0' corresponds to the sensing beam A2 according to the TCI state of '0' as shown in table T-2. After the UE 301 receives the GC-PDCCH, the UE 301 determines that the value of the received indicator, e.g., the value of '0', matches the first row index, that is, row index '0' in the table T-2. The row associated with the row index '0' corresponds to the sensing beam A2 based on the TCI state of '0'. With this information, the UE 301 determines the CO initiated by the BS 302 after completing the directional LBT procedure with the sensing beam A2.

Accordingly, based on the table T-2, the UE 301 can determine that DL transmission beam used by the BS 301 within a spatial region S3 of the CO initiated by the BS 302 after completing the directional LBT procedure with the sensing beam A2 includes at least the DL transmission beam a2, which is indicated by the same TCI state '0' as the sensing beam A2.

Further, because there is no DL transmission beam indicated in the row with row index '0' in the table T-2 (i.e., value of 'NULL' is indicated in the row with row index '0' in the table T-2), the UE 301 can determine that DL transmission beam which is within the spatial region S3 of the CO initiated by the BS 302 after completing the directional LBT procedure with the sensing beam A2 includes only the DL transmission beam a2, and the UE 301 may not need to check the rest of the table T-2.

Figure 3D:
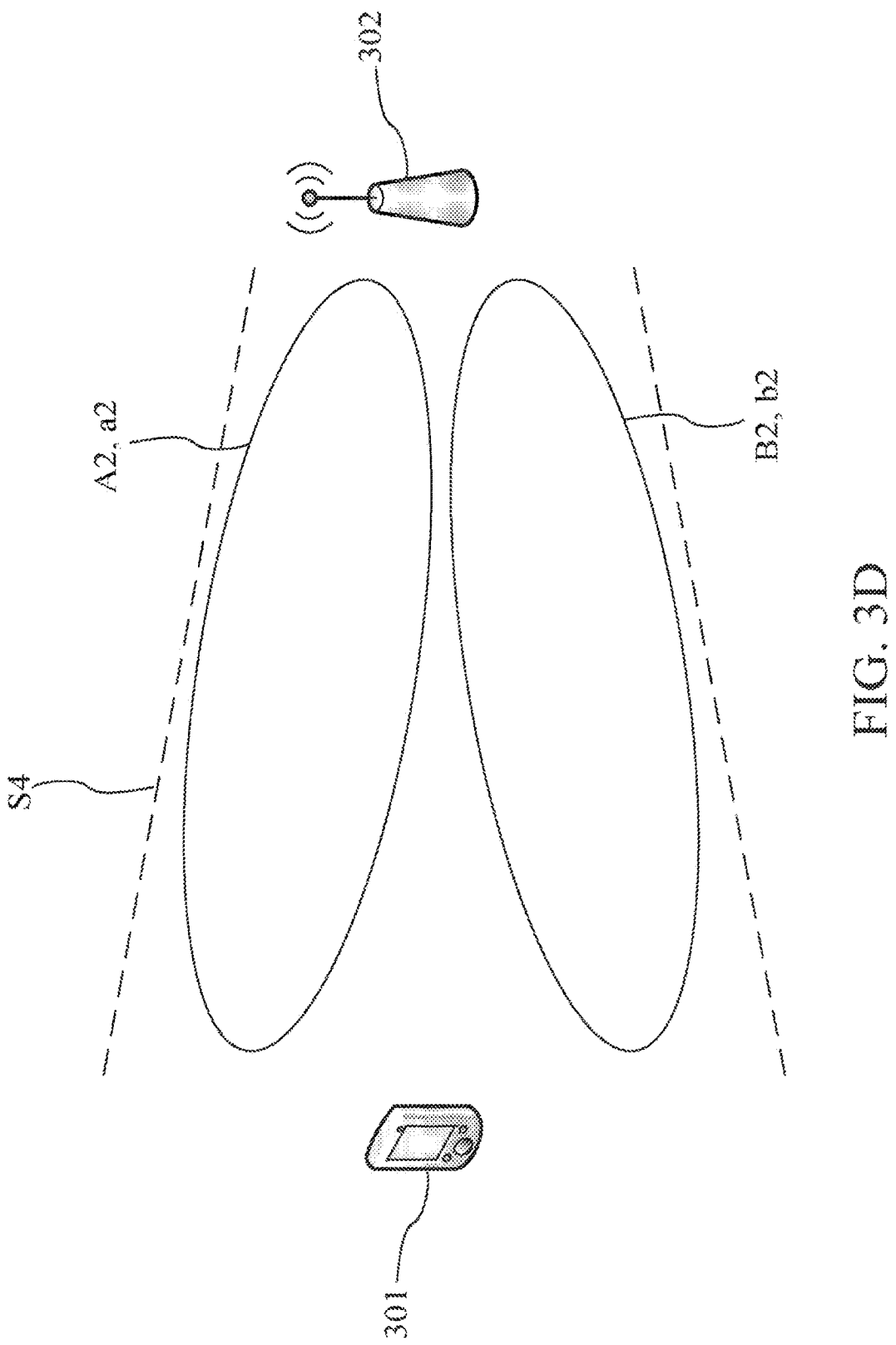
FIG. 3D illustrates a schematic diagram of beamforming in accordance with some embodiments of the present application.

Referring to FIG. 3D, when the BS 302 initiates a CO after performing a directional LBT procedure with sensing beams A2 and B2, the BS 302 will transmit a GC-PDCCH carrying an indicator that is set to a value of '01'. The value of '01' corresponds to the row indexes '0' and '1' associated with sensing beams A2 and B2 according to TCI states of '0' and '1', respectively, as shown in the table T-2. After the UE 301 receives the GC-PDCCH, the UE 301 determines that the value of the received indicator, e.g., the value of '01', matches the first row index (row index '0') and the second row index (row index '1') of the table T-2. The rows associated with row indexes '0' and '1' correspond to the sensing beam A2 and B2 based on the TCI states '0' and '1'. With this information, the UE 301 determines the CO initiated by the BS 102 after completing the directional LBT procedure with the sensing beams A2 and B2.

Accordingly, based on the table T-2, the UE 301 can determine that DL transmission beams used by the BS 301 within a spatial region S4 of the CO initiated by the BS 302 after completing the directional LBT with the sensing beams A2 and B2 include at least: (1) the DL transmission beam a2, which is indicated by the same TCI state '0' as the sensing beam A2; and (2) the DL transmission beam b2, which is indicated by the same TCI state '1' as the sensing beam B2.

Furthermore, because: (1) there is no DL transmission beam indicated in the row with row index '0' in the table T-2 (i.e., value of 'NULL' is indicated in the row with row index '0' in the table T-2); and (2) there is no DL transmission beam indicated in the row with row index '1' in the table T-2 (i.e., value of 'NULL' is indicated in the row with row index '1' in the table T-2), the UE 301 may determine that DL transmission beams which are within the spatial region S4 of the CO initiated by BS 302 after completing the directional LBT procedure with the sensing beams A2 and B2 include only the DL transmission beams a2 and b2, and the UE 301 may not need to check the rest of the table T-2.

In a 3GPP 5G NR network, a control resource set (CORE-SET) is a time-frequency resource for a UE monitoring PDCCH transmission from a BS. The size and location of a CORESET in a time-frequency domain are configured by the BS. For each CORESET, a DL transmission beam is also configured by the BS. The BS will use the DL transmission beam for transmitting the PDCCH in the corresponding CORESET. A search space set which is also configured by the BS, is a set of PDCCH candidates configured with periodicity and other parameters. Each search space set corresponds to one CORESET. A PDCCH candidate means a possible PDCCH transmission from the BS that UE needs to monitor. A UE can monitor a set of PDCCH candidates in one or more CORESETs according to search space set(s)

Accordingly, in some embodiments, after a UE determines which DL transmission beam is within a spatial region of a CO, the UE of the present disclosure may only monitor PDCCH candidate(s) in CORESET(s) of the cell for which the BS configures a DL transmission beam(s) which is/are within spatial region of the CO until the end of the CO duration.

In one embodiment, a UE detects and decodes a PDCCH (e.g., GC-PDCCH), in which an indicator and a remaining CO duration are transmitted. According to the indicator received, the UE can determine: (1) at least one sensing beam used by the BS to perform directional LBT procedure; and (2) at least one DL transmission beam which is within a spatial region of a CO initiated by the BS after completing a directional LBT procedure with the at least one sensing beam.

Accordingly, the UE monitors PDCCH candidates in at least one CORESET which corresponds to the at least one DL transmission beam which is within the spatial region of the CO initiated by the BS after completing a directional LBT procedure with the at least one sensing beam, until the end of the CO duration, but does not monitor PDCCH candidates in other CORESET(s) which correspond to DL transmission beam(s) which is/are not within the spatial region of the CO initiated by the BS after completing the directional LBT procedure with the at least one sensing beam, until the end of the current CO.

Figure 4A:
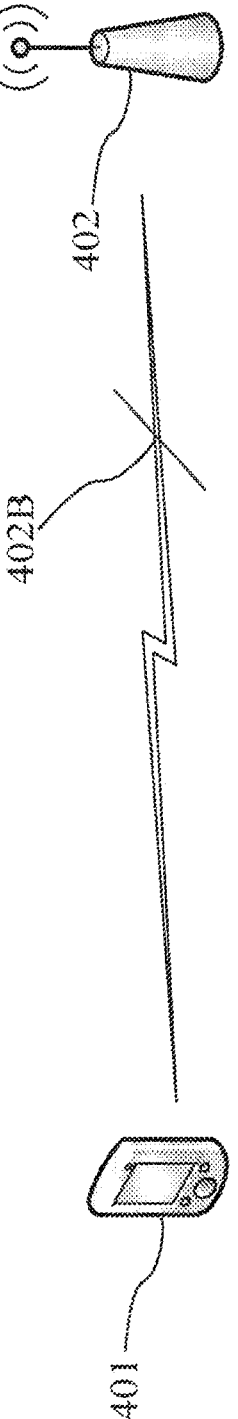
FIG. 4A illustrates a schematic diagram of message transmission in accordance with some embodiments of the present application.
Figure 4B:
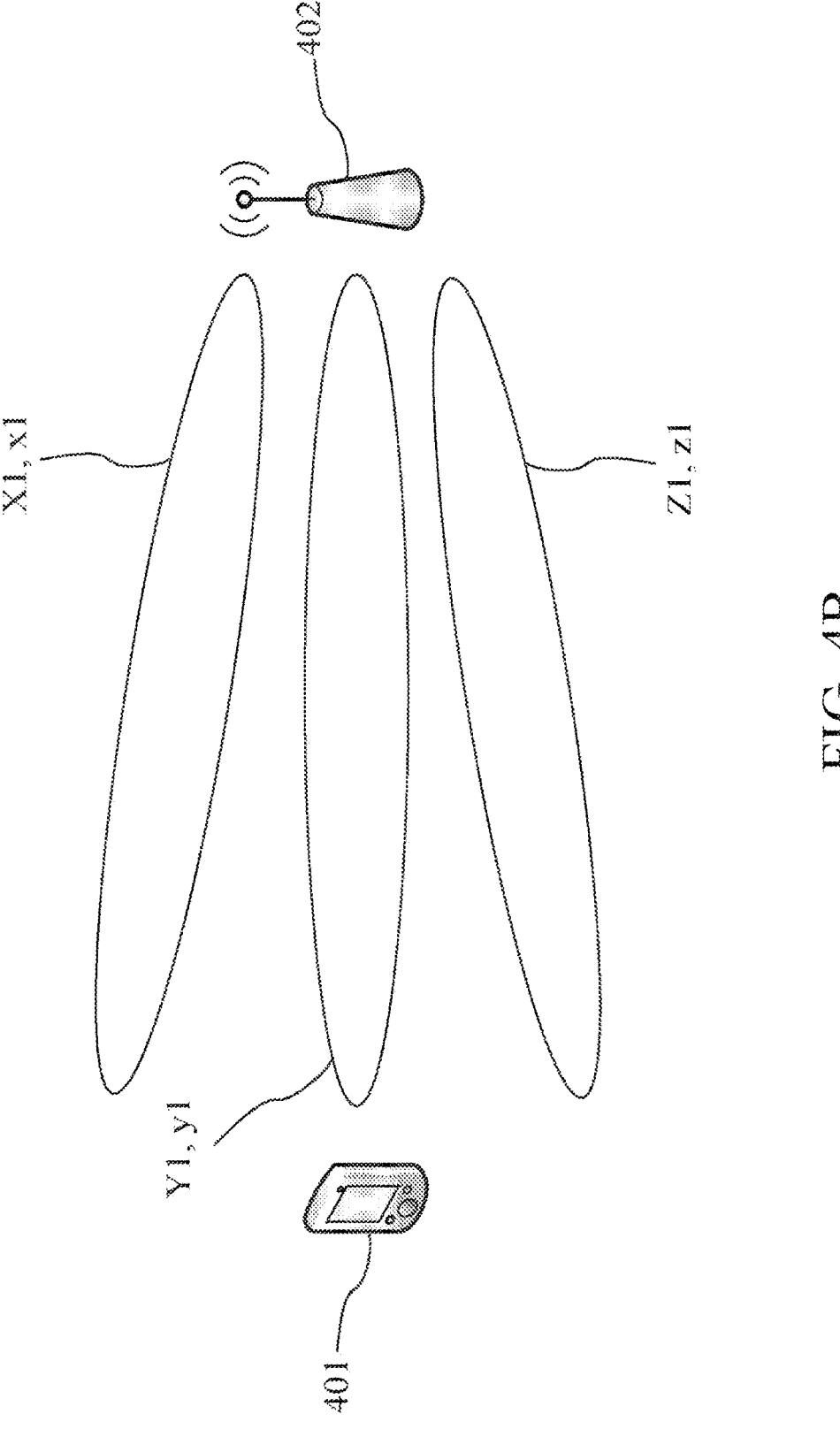
FIG. 4B illustrates a schematic diagram of beamforming in accordance with some embodiments of the present application.
Figure 4C:
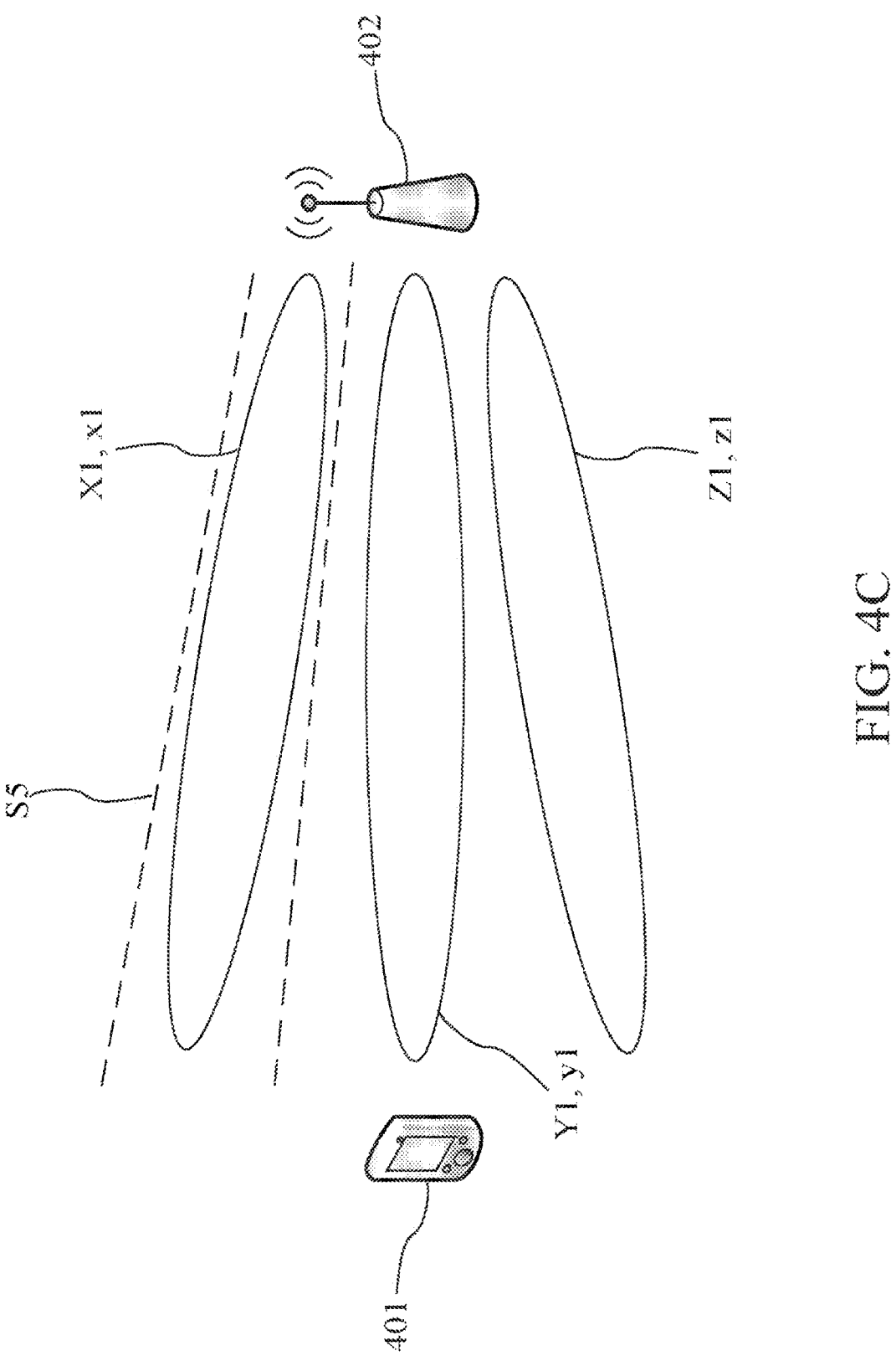
FIG. 4C illustrates a schematic diagram of beamforming in accordance with some embodiments of the present application.

Referring to FIGS. 4A to 4C, in one implementation, a sensing beam X1 and a DL transmission beam x1 may be indicated by the same TCI state '0', a sensing beam Y1 and a DL transmission beam y1 may be indicated by the same TCI state '1' and a sensing beam Z1 and a DL transmission beam z1 may be indicated by the same TCI state '2'. A BS 402 may determine a table T-3 as shown below and transmit this table using a higher layer signaling 402B to a UE 401.

TABLE T-3

| Row index | Sensing Beam | DL Transmission Beam |
|-----------|--------------|----------------------|
| 0 | 0 | NULL |
| 1 | 1 | NULL |
| 2 | 2 | NULL |

In this implementation, according to the higher layer signaling 402B, the UE 401 is configured with three CORE-SETs (i.e., first CORESET, second CORESET and third CORESET), and the DL transmission beams x1, y1 and z1 are configured for the CORESETs respectively. The UE 401 needs to monitor a set of PDCCH candidates in the three CORESETs according to corresponding search space sets.

Then, the UE 401 detects and decodes a PDCCH (e.g., GC-PDCCH), in which an indicator that is set to a value '0' and a remaining CO duration are identified. According to the indicator that is set to value of '0' and the TCI states recorded in table T-3, the UE 401 determines: (1) that the sensing beam X1 is used by the BS 402 to perform a directional LBT procedure; and (2) that only the DL transmission beam x1 is within a spatial region S5 of a CO initiated by the BS 402 after completing the directional LBT procedure with the sensing beam X1.

Accordingly, the UE 401 monitors PDCCH candidates in the first CORESET which corresponds to the DL transmission beam x1, but does not monitor PDCCH candidates in the second CORESET and the third CORESET, which correspond to the DL transmission beams y1 and z1, until the end of the CO duration.

Figure 5A:
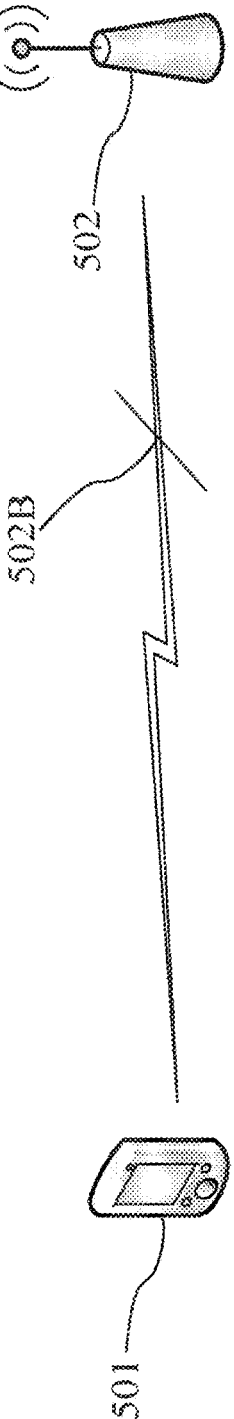
FIG. 5A illustrates a schematic diagram of message transmission in accordance with some embodiments of the present application.
Figure 5B:
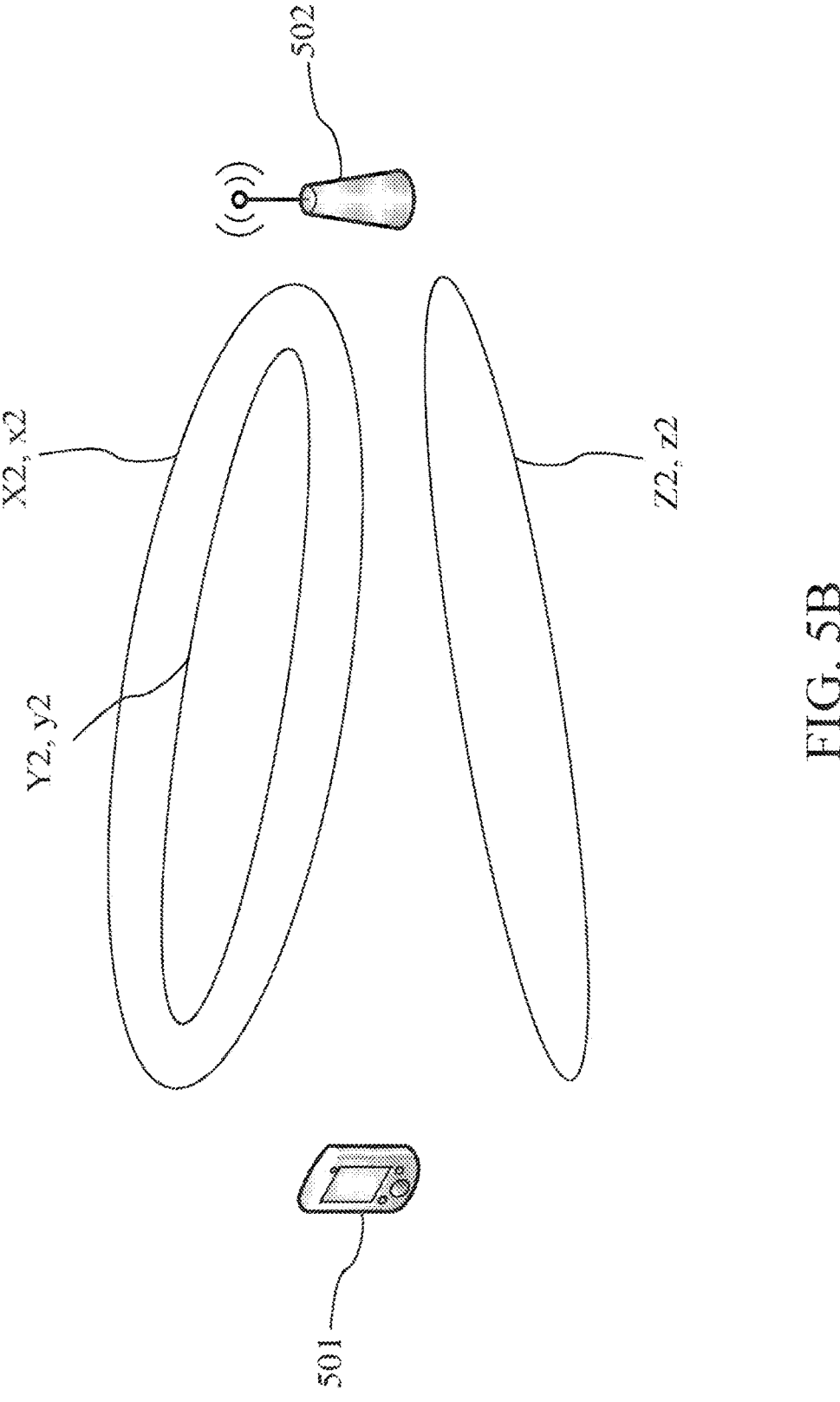
FIG. 5B illustrates a schematic diagram of beamforming in accordance with some embodiments of the present application.
Figure 5C:
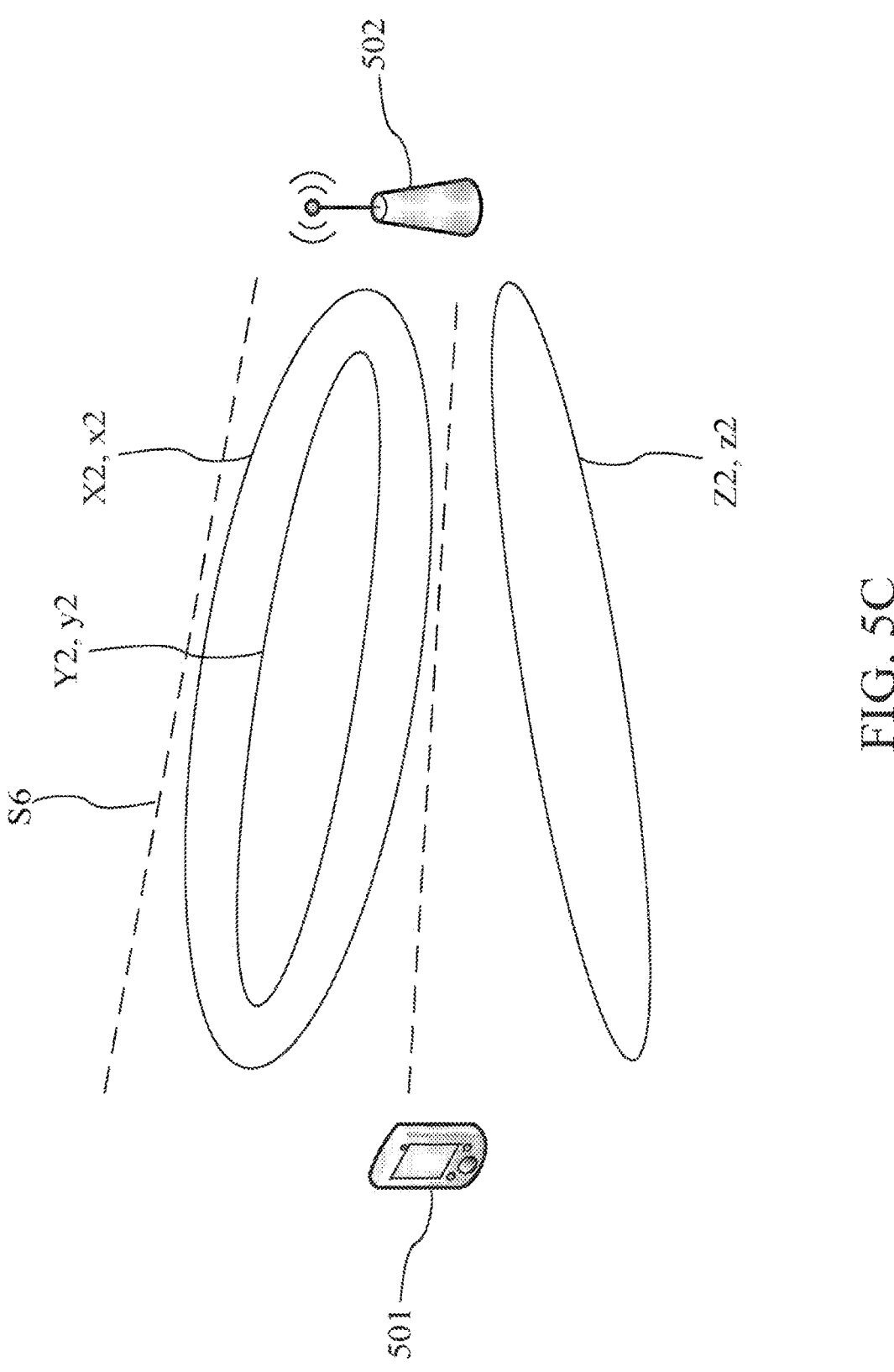
FIG. 5C illustrates a schematic diagram of beamforming in accordance with some embodiments of the present application.

Referring to FIGS. 5A to 5C, in one implementation, a sensing beam X2 and a DL transmission beam x2 may be indicated by the same TCI state '0', a sensing beam Y2 and a DL transmission beam y2 may be indicated by the same TCI state '1' and a sensing beam Z2 and a DL transmission beam z2 may be indicated by the same TCI state '2'. A BS 502 may determine a table T-4 as shown below and transmit this table using a higher layer signaling 502B to a UE 501.

TABLE T-4

| Row index | Sensing Beam | DL Transmission Beam |
|-----------|--------------|----------------------|
| 0 | 0 | 1 |
| 1 | 1 | NULL |
| 2 | 2 | NULL |

In this implementation, according to the higher layer signaling 502B, the UE 501 is configured with three CORESETs (i.e., first CORESET, second CORESET and third CORESET), and the DL transmission beams x2, y2 and z2 are configured for the CORESETs, respectively. The UE 501 needs to monitor a set of PDCCH candidates in the three CORESETs according to corresponding search space sets.

Then, the UE 501 detects and decodes a PDCCH (e.g., GC-PDCCH), in which an indicator that is set to a value '0' and a remaining CO duration are identified. According to the indicator that is set to value of '0' and the table T-4, the UE 501 can determine: (1) that the sensing beam X2 is used by the BS 502 to perform directional LBT procedure; and (2) that the DL transmission beams x2 and y2 are within a spatial region S6 of the CO initiated by the BS 502 after completing the directional LBT with the sensing beam X2.

Accordingly, the UE 501 monitors PDCCH candidates in the first CORESET and the second CORESET which correspond to the DL transmission beams x2 and y2, but does not monitor PDCCH candidates in the third CORESET, which corresponds to the DL transmission beam z1, until the end of the CO duration.

Figure 6A:
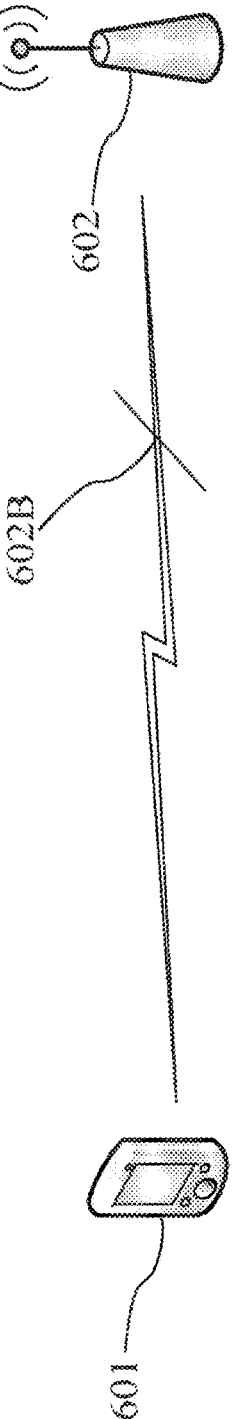
FIG. 6A illustrates a schematic diagram of message transmission in accordance with some embodiments of the present application.
Figure 6B:
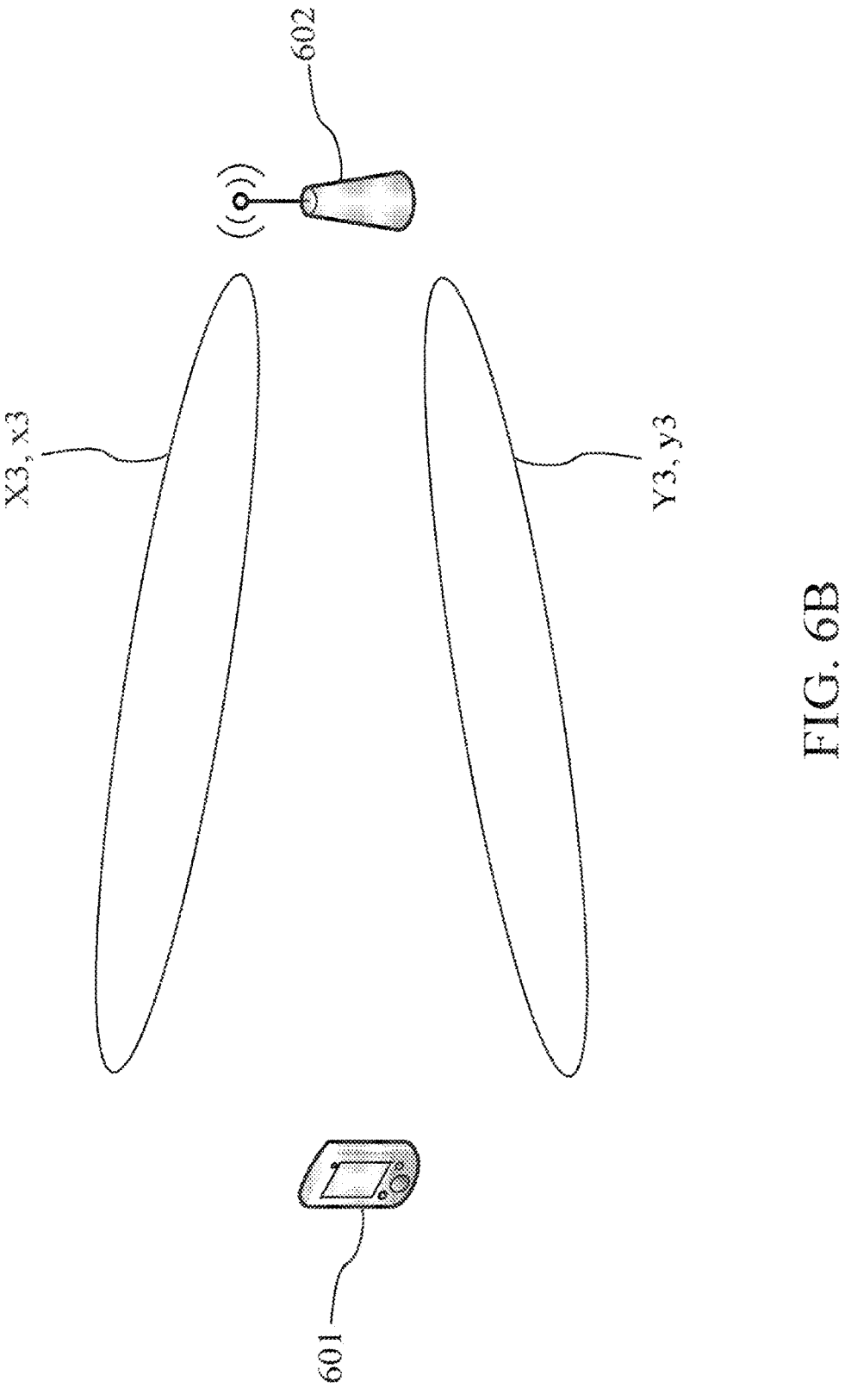
FIG. 6B illustrates a schematic diagram of beamforming in accordance with some embodiments of the present application.
Figure 6C:
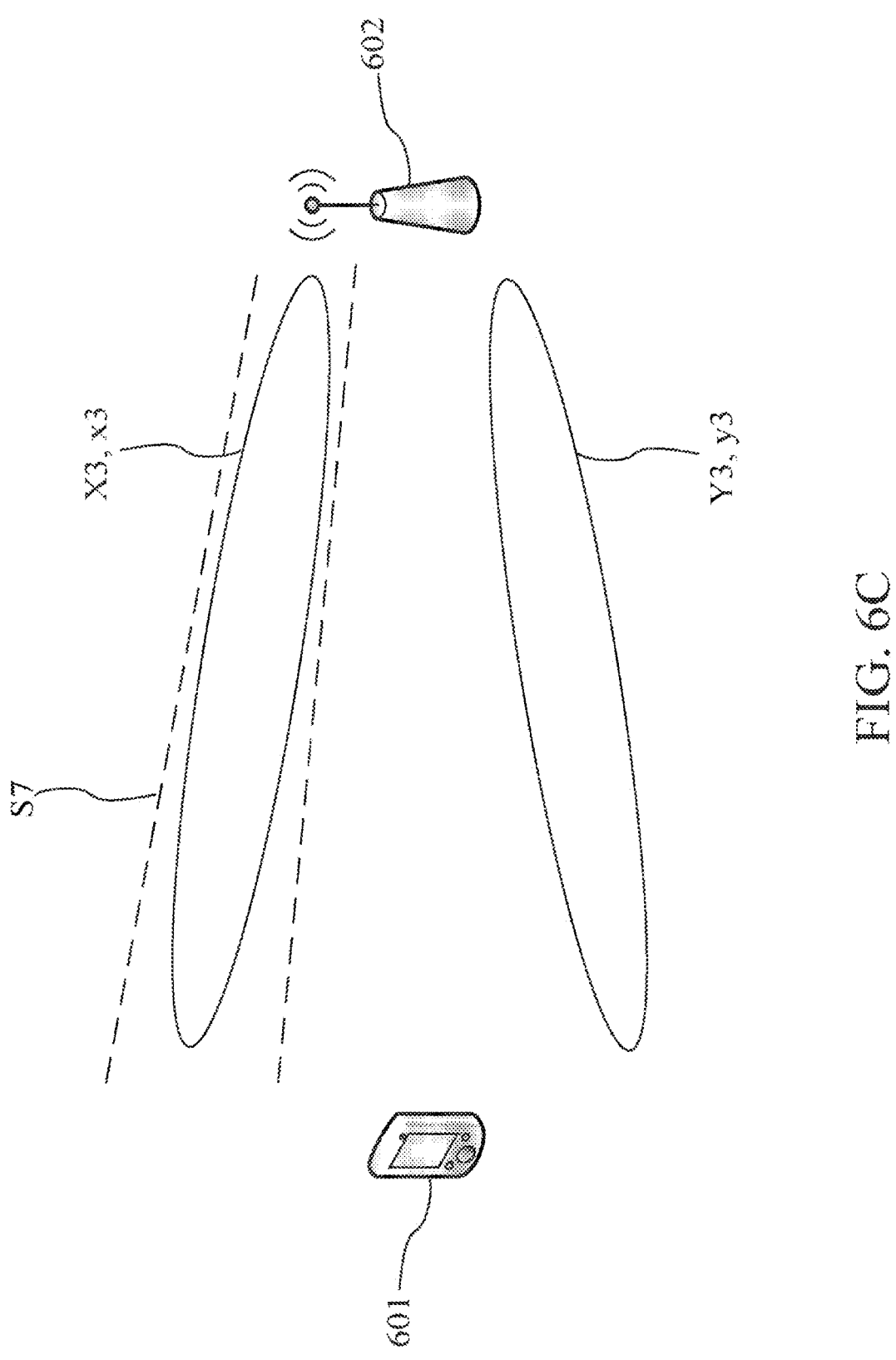
FIG. 6C illustrates a schematic diagram of beamforming in accordance with some embodiments of the present application.
Figure 7A:
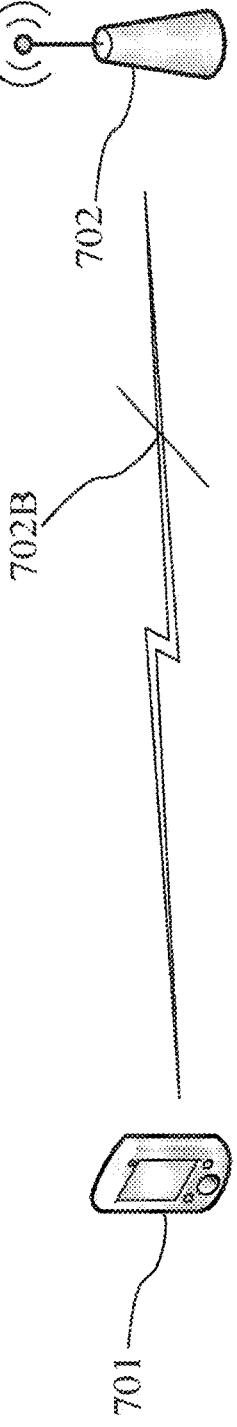
FIG. 7A illustrates a schematic diagram of message transmission in accordance with some embodiments of the present application.
Figure 7B:
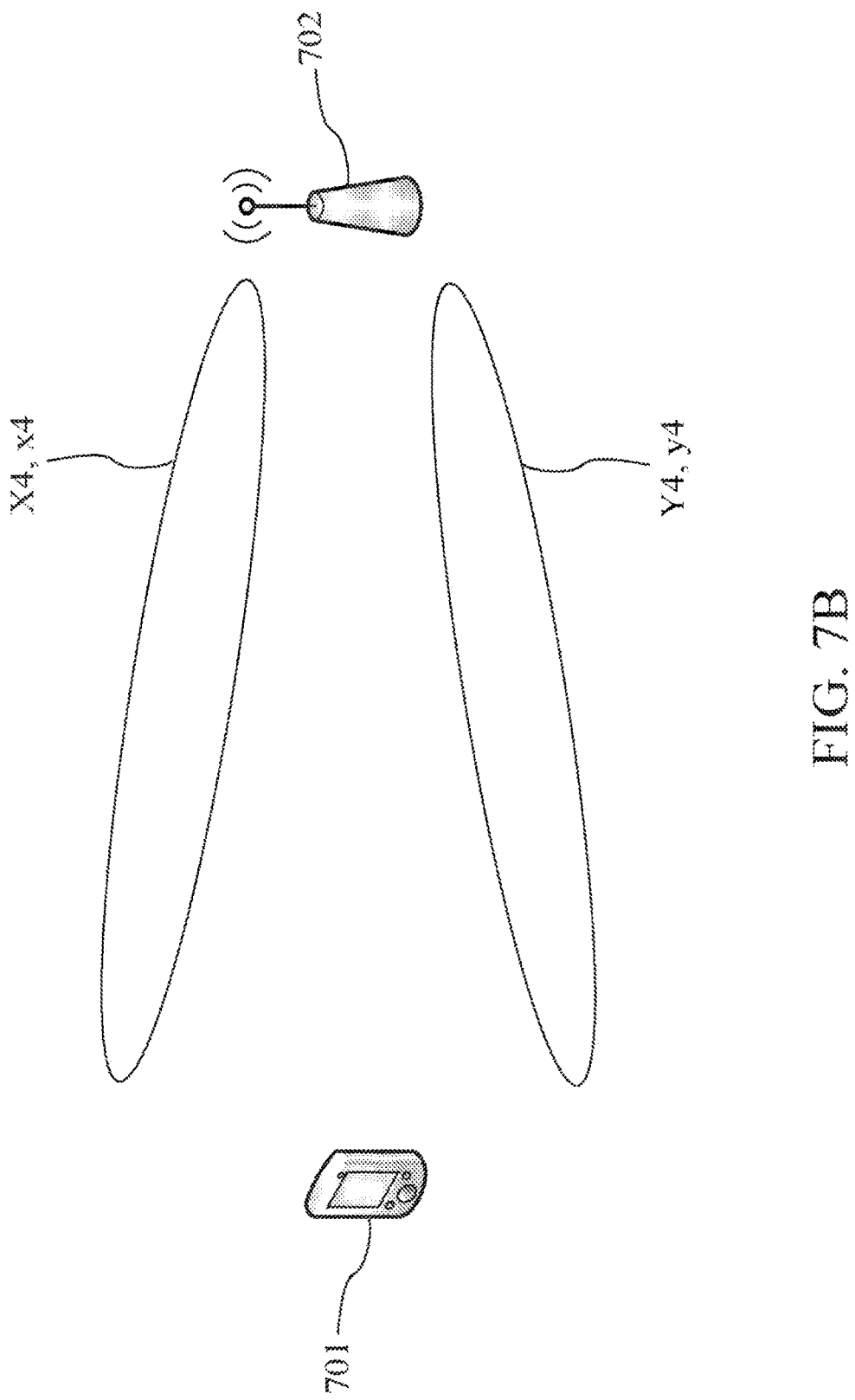
FIG. 7B illustrates a schematic diagram of beamforming in accordance with some embodiments of the present application.
Figure 7C:
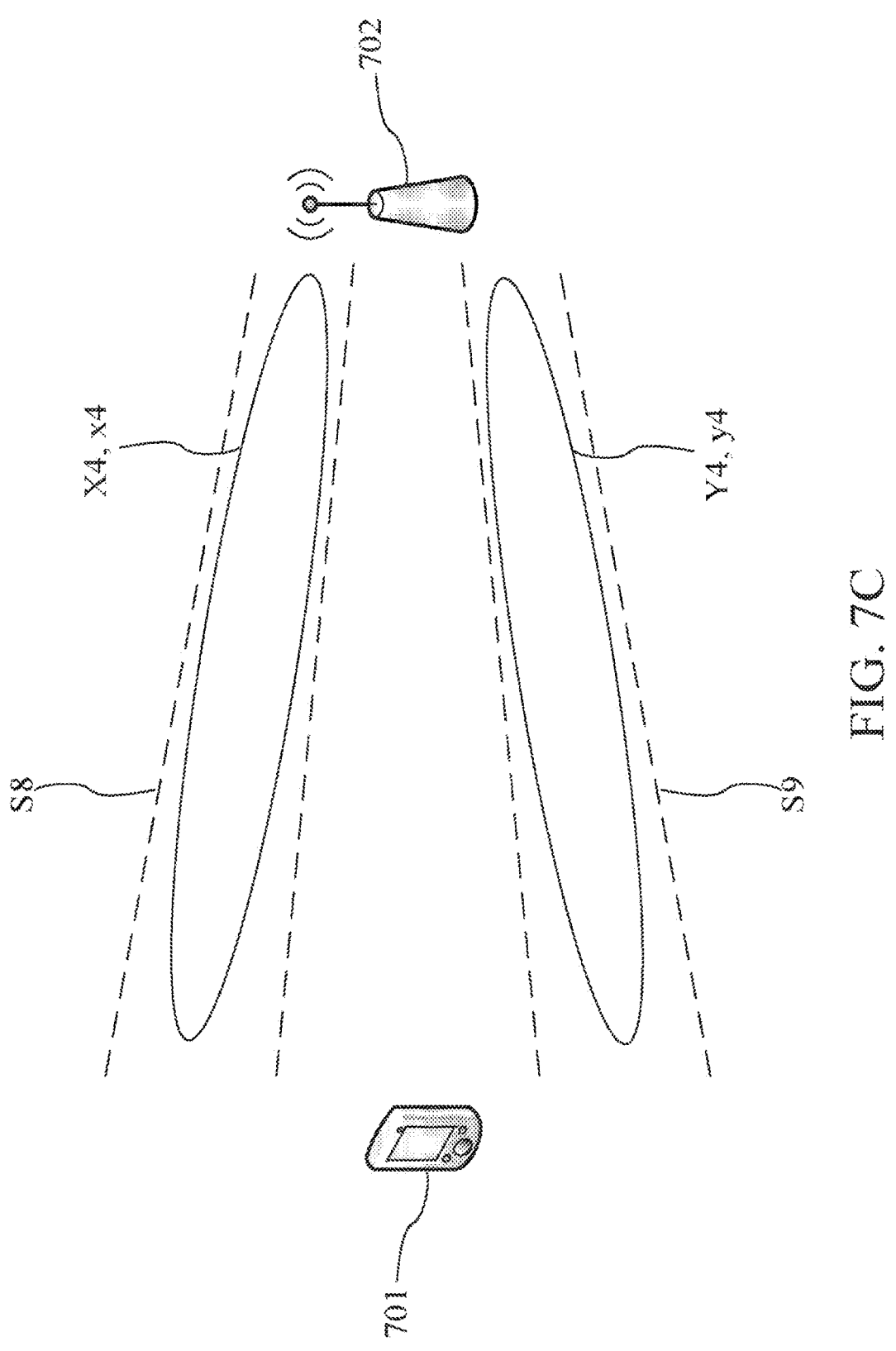
FIG. 7C illustrates a schematic diagram of beamforming in accordance with some embodiments of the present application.
Figure 7D:
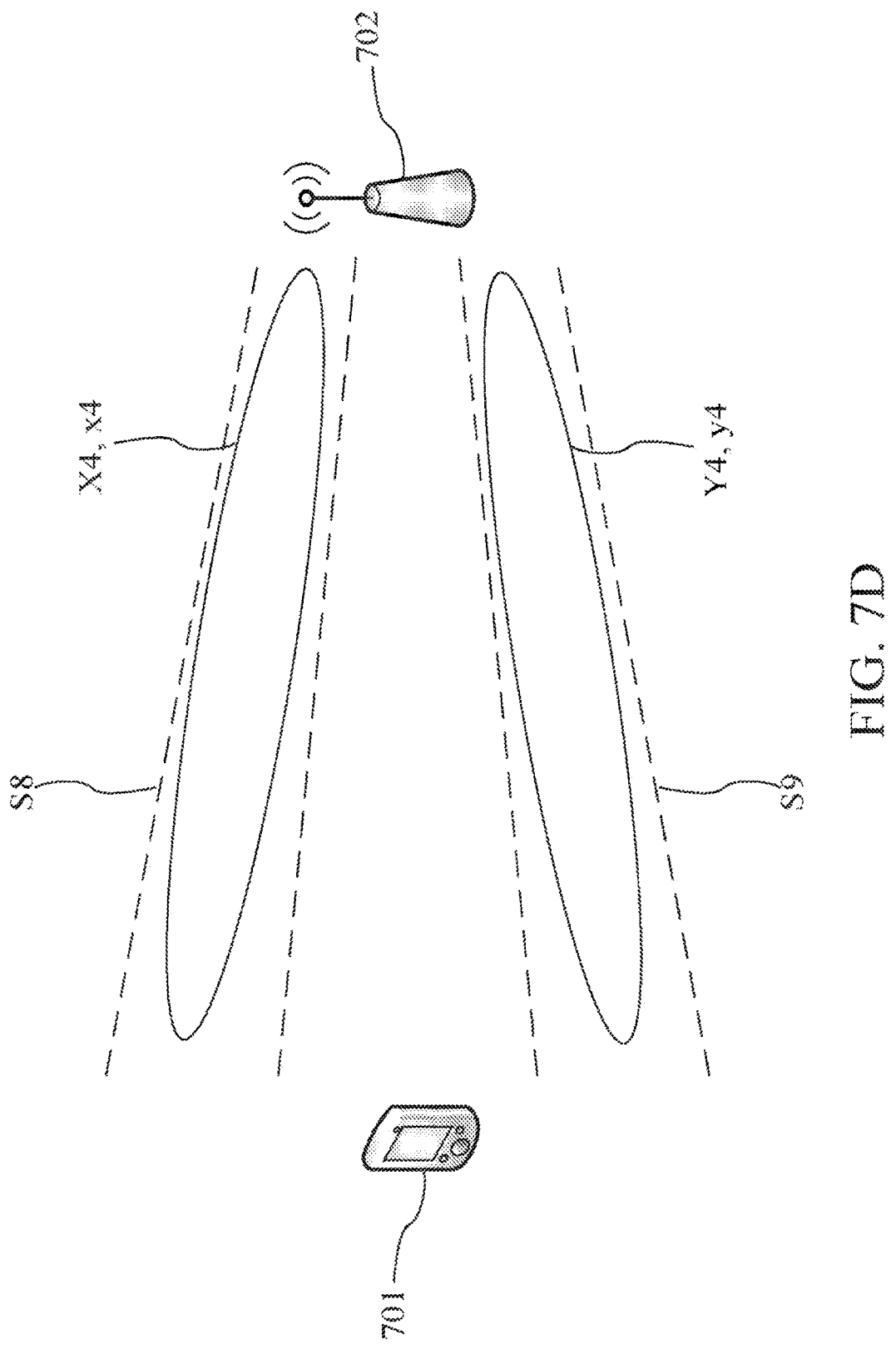
FIG. 7D illustrates a schematic diagram of beamforming in accordance with some embodiments of the present application.

Referring to FIGS. 6A to 6C, in one implementation, a sensing beam X3 and a DL transmission beam x3 may be indicated by the same TCI state '00', and a sensing beam Y3 and a DL transmission beam y3 may be indicated by the same TCI state '01'. Accordingly, a BS 602 may determine a table T-5 as shown below and transmit this table using a higher layer signaling 602B to a UE 601.

TABLE T-5

| Row index | Sensing Beam | DL Transmission Beam |
|-----------|--------------|----------------------|
| 0 | 00 | NULL |
| 1 | 01 | NULL |

In this implementation, according to the higher layer signaling 602B, the UE 601 is configured with three CORESETs (i.e., first CORESET, second CORESET and third CORESET), and the DL transmission beam x3 is configured for the first CORESET and the second CORESET, and the DL transmission beam y3 is configured for the third CORESET. The UE 601 needs to monitor a set of PDCCH candidates in the three CORESETs according to corresponding search space sets Then, the UE 601 detects and decodes a PDCCH (e.g., GC-PDCCH), in which an indicator that is set to a value of '0' and a remaining CO duration are identified. According to the indicator that is set to value of '0' and the table T-5, the UE 601 can determine: (1) that the sensing beam X3 is used by the BS 602 to perform directional LBT procedure; and (2) that only the DL transmission beam x3 is within a spatial region S7 of the CO initiated by the BS 602 after completing the directional LBT with the sensing beam X3.

Accordingly, the UE 601 monitors PDCCH candidates in the first CORESET and the second CORESET which correspond to the DL transmission beam x3, but does not monitor PDCCH candidates in the third CORESET, which corresponds to the DL transmission beams y3, until the end of the CO duration.

In 3GPP 5G NR network, a search space set is configured with a periodicity and a search space set group index. After receiving a predefined value of a search space set switching field in a GC-PDCCH, a UE will perform a search space set group switching procedure, which includes that the UE will stop monitoring PDCCH according to search space sets with a first search space set group index and starts monitoring PDCCH according to search space sets with a second search space set group index. A search space set with a first search space set group index may be configured with a smaller periodicity comparing to a search space set with a second search space set group index. The UE may monitor PDCCH according to the search space sets with a first search space set group index, that is, according to the search space sets with a smaller periodicity before the UE determines that a BS initiates a CO. After the UE receives the predefined value of the search space set switching field in the GC-PDCCH, the UE will monitor PDCCH according to the search space sets with a second search space set group index, that is, according to the search space sets with a larger periodicity for power saving.

In some embodiments, the BS can maintain more than one CO simultaneously, and the UE can monitor PDCCH candidates in different CORESETs, which correspond to different COs. After completing multiple directional LBT procedures, the BS can initiate multiple COs and transmit a DCI in a PDCCH (e.g., GC-PDCCH) for each CO. After receiving the multiple DCIs, the UE may determine remaining CO duration and sensing beam(s) used by the BS to perform a directional LBT procedure corresponding to each CO. According to the determined sensing beams and relations between the sensing beams and the DL transmission beams, the UE can distinguish different COs according to the determined sensing beam(s) used by the BS to perform a directional LBT procedure corresponding to each CO, and then can perform search space set group switching procedures according to different COs as described below.

In one embodiment, the UE may: (1) perform search space sets group switching procedures for search space sets which correspond to CORESETs which are configured with DL transmission beams within spatial region of COs initiated by the BS after completing directional LBT procedures with the determined sensing beams; but (2) not perform search space sets group switching procedures for search space sets which correspond to CORESETs which are configured with DL transmission beams not within the spatial region of COs initiated by the BS after completing directional LBT procedures with the determined sensing beams.

Referring to FIGS. 7A to 7D, in one implementation, a sensing beam X4 and a DL transmission beam x4 may be indicated by the same TCI state '00', and a sensing beam Y4 and a DL transmission beam y4 may be indicated by the same TCI state '01'. Accordingly, a BS 702 may determine a table T-6 as shown below and transmit this table using a higher layer signaling 702B to a UE 701.

TABLE T-6

| Row index | Sensing Beam | DL Transmission Beam |
|-----------|--------------|----------------------|
| 0 | 00 | NULL |
| 1 | 01 | NULL |

In this implementation, according to the higher layer signaling 702B, the UE 701 is configured with two CORE-SETs (i.e., first CORESET and second CORESET), and DL transmission beams x4 and y4 are configured for the first CORESET and the second CORESET, respectively. According to the higher layer signaling 702B, the UE 701 is also configured with four search space sets (i.e., first search space set, second search space set, third search space set and fourth search space set). The first search space set and the second search space set correspond to the first CORESET, and the third search space set and the fourth search space set correspond to the second CORESET. The UE 701 is provided a first search space set group index for the first search space set and the third search space set and a second search space set group index for the second search space set and the fourth search space set. Before the UE 701 receives a GC-PDCCH for a CO, that is, before the UE 701 determines a CO is initiated, it monitors PDCCH in the first and second CORESETs on a cell according to the first search space set corresponding to the first CORESET and the third search space set corresponding to the second CORESET. The first search space set and the third search space set are associated with the first search space set group index and are configured with a smaller periodicity.

Then, the UE 701 detects a first received GC-PDCCH in a first slot, in which a value of a search space set switching field is set, for example, to a value of '1' which is predefined for search space set switching, an indicator that is set to a value of '0' and a remaining CO duration are identified. According to the indicator that is set to value of '0' and the table T-6, the UE 701 determines that: (1) the sensing beam X4 is used by the BS to perform a directional LBT procedure; (2) the DL transmission beam x4 is within a spatial region S8 of a first CO initiated by the BS 702 after completing the directional LBT procedure with the sensing beam X4; and (3) the DL transmission beam y4 is not within the spatial region S8 of the first CO.

As the DL transmission beam x4, which corresponds to the first CORESET, is within the spatial region S8 of the first CO and the search space set switching field is set to '1', the UE 701 performs a search space set switching procedure for search space sets which correspond to the first CORESET. During the search space set switching procedure, the UE 701 stops monitoring PDCCH according to the first search space set associated with the first search space set group index and starts to monitor PDCCH according to the second search space set corresponding to the second search space set group index. The UE 701 then sets a value of a first timer to a value provided by the higher layer signaling 702B, and the first timer is used for the UE 701 to switch back from the second search space set to the first search space set. The value of the first timer can be provided to the UE 701 by the BS 702. As the DL transmission beam y4 that corresponds to the second CORESET is outside the spatial region S8 of the first CO, the UE 701 do not perform search space sets group switching procedure for search space sets which correspond to the second CORESET, that is, keep monitoring PDCCH according to the third search space set.

Then, the UE 701 detects a second received GC-PDCCH in a second slot over the third search space set, in which a value of a search space set switching field is set to a value of '1' which is predefined for search space set switching, an indicator that is set to a value of '1' and a remaining CO duration are indicated. According to the indicator that is set to value of '1' and the table T-6, the UE 701 determines that: (1) the sensing beam Y4 is used by the BS 702 to perform another directional LBT procedure; (2) the DL transmission beam y4 is within a spatial region S9 of a second CO initiated by the BS 702 after completing the another directional LBT procedure with the sensing beam Y4; and (3) the DL transmission beam x4 is not within the spatial region S9 of the second CO.

As the DL transmission beam y4, which corresponds to the second CORESET, is within the spatial region S9 of the second CO, and the search space set switching field is set to a value of '1', the UE 701 performs search space sets group switching procedure for search space sets which correspond to the second CORESET. During the search space set switching procedure, the UE 701 stops monitoring PDCCH according to the third search space set and starts to monitor PDCCH according to the fourth search space set. The UE 701 then sets a value of a second timer to the value provided by the higher layer signalling 702B, and the second timer is used for the UE 701 to switch back from the fourth search space set to the third search space set. The value of the second timer can be provided to the UE 701 by the BS 702.

When the first timer expires, the UE 701 stops monitoring PDCCH according to the second search space set and starts to monitor PDCCH according to the first search space set. When the second timer expires, the UE 701 stops monitoring PDCCH according to the fourth search space set and starts to monitor PDCCH according to the first search space set and the third search space set.

FIG. 8 illustrates a flow chart of a method for wireless communications in accordance with some embodiments of the present application. Referring to FIG. 8, method 800 is performed by a UE in some embodiments of the present application.

In some embodiments, operation S801 is executed to receive, by the UE, a DCI from a BS. The DCI may include an indicator. Operation S802 is executed to determine, by the UE, one or more sensing beams according to the indicator and a higher layer signaling. The one or more sensing beams are used by the BS to perform directional LBT procedure. Operation S803 is executed to determine, by the UE, one or more DL transmission beams according to the indicator and the higher layer signaling. The one or more DL transmission beams are used by the BS to transmit PDCCH and are within a spatial region of a CO initiated by the BS after completing directional LBT procedure with the one or more sensing beams.

FIG. 9 illustrates a flow chart of a method for wireless communications in accordance with some embodiments of the present application. Referring to FIG. 9, method 900 is performed by a UE in some embodiments of the present application.

In some embodiments, operation S901 is executed to receive, by the UE, a higher layer signaling (e.g., RRC signaling and/or MAC-CE signaling) from a BS. The higher layer signaling includes a table. Operation S902 is executed to receive, by the UE, a DCI from a BS. The DCI may include an indicator. Operation S903 is executed to determine, by the UE, one or more sensing beams according to the indicator and a higher layer signaling. The indicator is used to identify at least one row of the table.

In these embodiments, the indicator matches at least one row index in the table, and the one or more sensing beams are used by the BS to perform a directional LBT procedure. Operation S904 is executed to determine, by the UE, a plurality of DL transmission beams according to the at least one row index of the table. The plurality of DL transmission beams are within a spatial region of a CO initiated by the BS after completing the directional LBT procedure with the one or more sensing beams.

Operation S905 is executed to determine, by the UE, if at least one of the plurality of DL transmission beams is associated with another sensing beam indicated by another row of the table. If yes, operation S906 is executed to determine, by the UE, one or more additional DL transmission beam(s) based on the another row of the table. If no, operation S907 is executed to stop, by the UE, checking the table.

FIG. 10 illustrates a flow chart of a method for wireless communications in accordance with some embodiments of the present application. Referring to FIG. 10, method 1000 is performed by a UE in some embodiments of the present application.

In some embodiments, operation S1001 is executed to receive, by the UE, a DCI from a BS. The DCI may include an indicator. Operation S1002 is executed to determine, by the UE, one or more sensing beams according to the indicator and a higher layer signaling. The one or more sensing beams are used by the BS to perform a directional LBT procedure. Operation S1003 is executed to determine, by the UE, one or more DL transmission beams according to the indicator and the higher layer signaling. The one or more DL transmission beams are used by the BS to transmit PDCCH and are within a spatial region of a CO initiated by the BS after completing the directional LBT procedure with the one or more sensing beams. The each of the one or more DL transmission beams corresponds to at least one CORE-SET.

Operation S1004 is executed to monitor, by the UE, PDCCH in the at least one CORESET during a remaining CO duration. Operation S1005 is executed to stop, by the UE, monitoring PDCCH in other CORESET(s) except the at least one CORESET. In other words, the UE monitors PDCCH only in the at least one CORESET during the remaining CO duration.

Figure 11B:
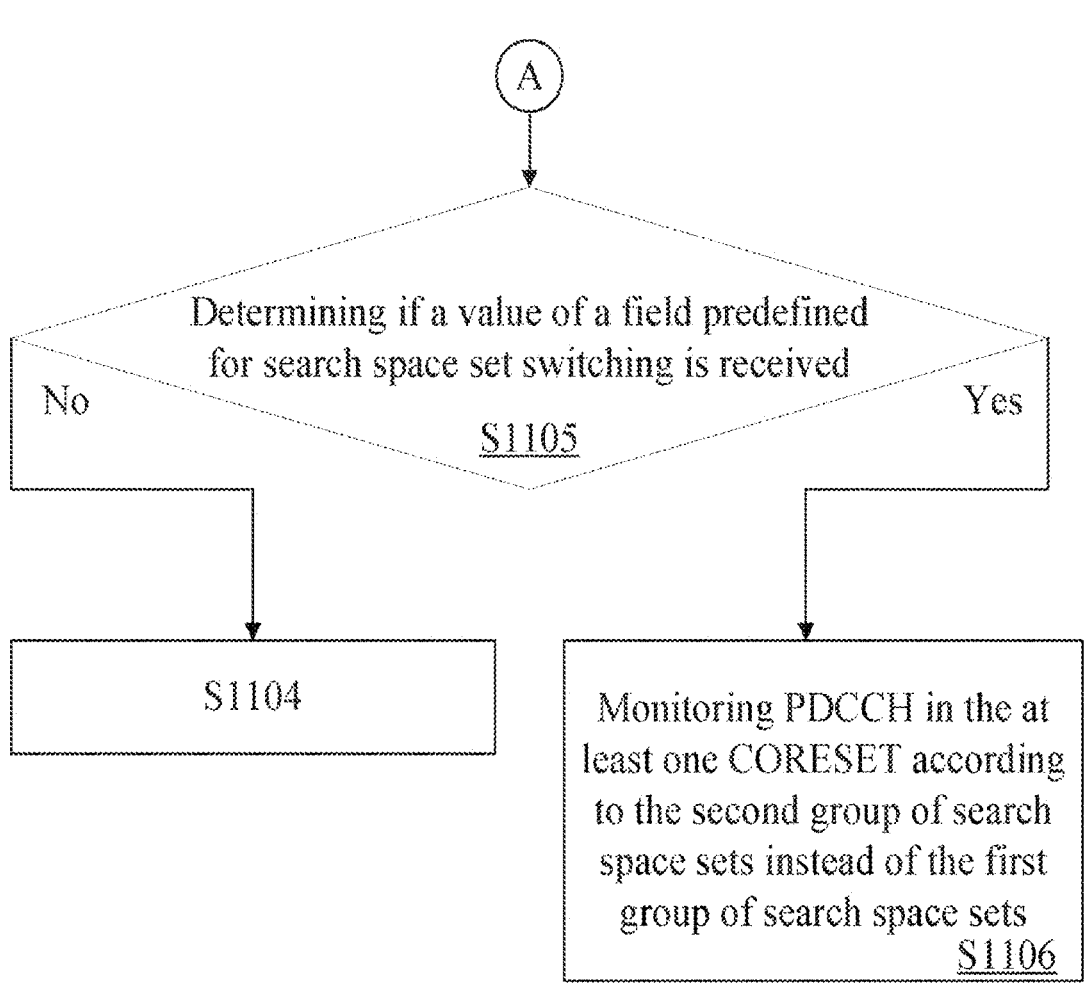

FIGS. 11A and 11B illustrate flow charts of a method for wireless communications in accordance with some embodiments of the present application. Referring to FIGS. 11A and 11B, method 1100 is performed by a UE in some embodiments of the present application.

In some embodiments, operation S1101 is executed to receive, by the UE, a DCI from a BS. The DCI may include an indicator. Operation S1102 is executed to determine, by the UE, one or more sensing beams according to the indicator and a higher layer signaling. The one or more sensing beams are used by the BS to perform directional LBT procedure. Operation S1103 is executed to determine, by the UE, one or more DL transmission beams according to the indicator and the higher layer signaling. The one or more DL transmission beams are used by the BS to transmit PDCCH and are within a spatial region of a CO initiated by the BS after completing the directional LBT procedure with the one or more sensing beams. The each of the one or more DL transmission beams correspond to at least one CORE-SET. The at least one CORESET corresponds to a first group of search space sets and a second group of search space sets.

Operation S1104 is executed to monitor, by the UE, PDCCH in the at least one CORESET according to the first group of search space sets. Operation S1105 is executed to determine, by the UE, if a value of a field predefined for search space switching is received in the DCI. If yes, operation S1106 is executed to monitor, by the UE, the PDCCH in the one or more CORESET(s) according to the second group of search space sets instead of the first group of search space sets. If no, operation S1104 is repeatedly executed.

Figure 12:
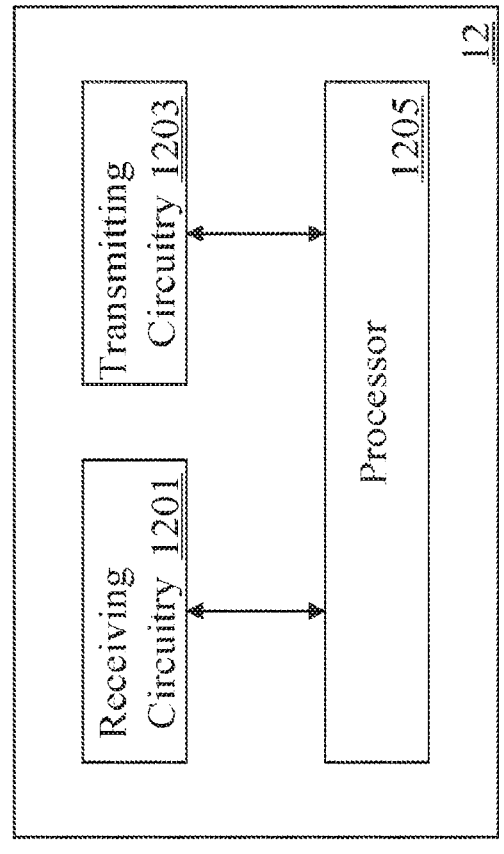
FIG. 12 illustrates a block diagram of an exemplary apparatus in accordance with some embodiments of the present application.

FIG. 12 illustrates an example block diagram of an apparatus 12 according to an embodiment of the present disclosure.

As shown in FIG. 12, the apparatus 12 may include at least one non-transitory computer-readable medium (not illustrated in FIG. 12), a receiving circuitry 1201, a transmitting circuitry 1203, and a processor 1205 coupled to the non-transitory computer-readable medium (not illustrated in FIG. 12), the receiving circuitry 1201 and the transmitting circuitry 1203. The apparatus 12 may be an UE.

Although in this figure, elements such as processor 1205, transmitting circuitry 1203, and receiving circuitry 1201 are described in the singular, the plural is contemplated unless limitation to the singular is explicitly stated. In some embodiments of the present disclosure, the receiving circuitry 1201 and the transmitting circuitry 1203 are combined into a single device, such as a transceiver. In certain embodiments of the present disclosure, the apparatus 12 may further include an input device, a memory, and/or other components.

In some embodiments of the present disclosure, the non-transitory computer-readable medium may have stored thereon computer-executable instructions to cause a processor to implement the method with respect to the user equipment as described above. For example, the computer-executable instructions, when executed, cause the processor 1205 interacting with receiving circuitry 1201 and transmitting circuitry 1203, so as to perform the operations with respect to the previous UEs.

Those having ordinary skill in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method performed by a user equipment (UE), the method comprising:

receiving, from a base station (BS), higher layer signaling including a table indicating one or more relations between one or more sensing beam indexes and one or more transmission beam indexes, wherein each row of a plurality of rows of the table is associated with a row index and indicates a sensing beam and one or more transmission beams;

receiving, from the BS, a downlink control information (DCI) including an indicator having a value corresponding to at least one row index of the table;

determining one or more sensing beams for a Listen-Before-Talk (LBT) procedure by matching the value of the indicator to the at least one row index to identify at least one row of the table; and determining one or more transmission beams for transmission of a physical downlink control channel (PDCCH) from the identified at least one row of the table, the one or more transmission beams being within a spatial region of a channel occupancy (CO) initiated by the BS after completing the LBT procedure with the one or more sensing beams.

2. The method of claim 1, further comprising:

determining a plurality of transmission beams according to the at least one row of the table, wherein the plurality of transmission beams are within a spatial region of a channel occupancy (CO) associated with the sensing beam.

3. The method of claim 1, wherein each of the one or more transmission beams used by the BS to transmit the PDCCH corresponds to at least one control resource set (CORESET).

4. The method of claim 3, further comprising:

monitoring the PDCCH only in the at least one CORESET during a remaining CO duration.

5. The method of claim 3, wherein the at least one CORESET corresponds to a first group of search space sets and a second group of search space sets, and further comprising:

monitoring the PDCCH in the at least one CORESET according to the second group of search space sets instead of the first group of search space sets if a value of a field predefined for search space set switching is received in the DCI.

6. The method of claim 1, further comprising:

determining a plurality of transmission beams according to the at least one row of the table, wherein the plurality of transmission beams are within a spatial region of a CO associated with the sensing beam.

7. The method of claim 6, further comprising:

determining if at least one of the plurality of transmission beams is associated with another sensing beam indicated by an additional row of the table.

8. The method of claim 7, further comprising:

determining one or more additional transmission beams based on the additional row of the table.

9. A user equipment (UE) for wireless communication, comprising:

at least one memory; and at least one processor coupled with the at least one memory and configured to cause the UE to:

receive, from a base station (BS), higher layer signaling including a table indicating one or more relations between one or more sensing beam indexes and one or more transmission beam indexes, wherein each row of a plurality of rows of the table is associated with a row index and indicates a sensing beam and one or more transmission beams;

receive, from the BS, a downlink control information (DCI) including an indicator having a value corresponding to at least one row index of the table;

determine one or more sensing beams for a Listen-Before-Talk (LBT) procedure by matching the value of the indicator to the at least one row index to identify at least one row of the table; and determine one or more transmission beams for transmission of a physical downlink control channel (PDCCH) from the identified at least one row of the table, the one or more transmission beams being within a spatial region of a channel occupancy (CO) initiated by the BS after completing the LBT procedure with the one or more sensing beams.

10. The UE of claim 9, wherein the at least one processor is configured to cause the UE to:

determine a plurality of transmission beams according to the at least one row of the table, wherein the plurality of transmission beams are within a spatial region of a CO associated with the sensing beam.

11. The UE of claim 10, wherein the at least one processor is configured to cause the UE to:

determine if at least one of the plurality of transmission beams is associated with another sensing beam indicated by an additional row of the table.

12. The UE of claim 11, wherein the at least one processor is configured to cause the UE to:

determine one or more additional transmission beams based on the additional row of the table.

13. The UE of claim 9, wherein each of the one or more transmission beams used for the transmission of the PDCCH corresponds to at least one control resource set (CORESET).

14. The UE of claim 13, wherein the at least one processor is configured to cause the UE to:

monitor the PDCCH only in the at least one CORESET during a remaining CO duration.

15. The UE of claim 13, wherein the at least one CORESET corresponds to a first group of search space sets and a second group of search space sets, and the at least one processor is configured to cause the UE to:

monitor the PDCCH in the at least one CORESET according to the second group of search space sets instead of the first group of search space sets if a value of a field predefined for search space set switching is received in the DCI.

16. A base station (BS) for wireless communication, comprising:

at least one memory; and at least one processor coupled with the at least one memory and configured to cause the BS to:

transmit, to a user equipment (UE), higher layer signaling including a table indicating relations between one or more sensing beam indexes and one or more transmission beam indexes, wherein each row of a plurality of rows of the table is associated with a row index and indicates a sensing beam and one or more transmission beams;

transmit, to the UE, a downlink control information (DCI) including an indicator having a value corresponding to at least one row index of the table;

perform, using one or more sensing beams indicated by at least one row of the table identified by the value of the indicator, a Listen-Before-Talk (LBT) procedure; and transmit, to the UE using one or more transmission beams from the identified at least one row of the table, physical downlink control channel (PDCCH), the one or more transmission beams being within a spatial region of a channel occupancy (CO) initiated by the base station after completing the LBT procedure with the one or more sensing beams.

17. A method performed by a base station (BS), the method comprising:

transmitting, to a user equipment (UE), higher layer signaling including a table indicating relations between one or more sensing beam indexes and one or more transmission beam indexes, wherein each row of a plurality of rows of the table is associated with a row index and indicates a sensing beam and one or more transmission beams;

transmitting, to the UE, a downlink control information (DCI) including an indicator having a value corresponding to at least one row index of the table;

performing, using one or more sensing beams indicated by at least one row of the table identified by the value of the indicator, a Listen-Before-Talk (LBT) procedure; and transmitting, to the UE using one or more transmission beams from the identified at least one row of the table, physical downlink control channel (PDCCH), the one or more transmission beams being within a spatial region of a channel occupancy (CO) initiated by the base station after completing the LBT procedure with the one or more sensing beams.

18. The method of claim 17, wherein the at least one row of the table indicates that at least one of the one or more transmission beams is associated with at least one sensing beam.

19. The method of claim 17, wherein each of the one or more transmission beams used to transmit the PDCCH corresponds to at least one control resource set (CORESET).

20. The method of claim 17, wherein the at least one row of the table indicates a plurality of transmission beams, wherein the plurality of transmission beams are within a spatial region of a CO associated with the sensing beam.

* * * * *